US012613745B2

(12) United States Patent
Dubeyko et al.

(10) Patent No.: US 12,613,745 B2
(45) Date of Patent: Apr. 28, 2026

(54) SYSTEM FOR USING ALWAYS IN-MEMORY DATA STRUCTURES IN A HETEROGENEOUS MEMORY POOL

(71) Applicant: Lemon Inc., Grand Cayman (KY)

(72) Inventors: Viacheslav Dubeyko, Los Angeles, CA (US); Jian Wang, Beijing (CN)

(73) Assignee: LEMON INC., Grand Cayman (KY)

( * ) Notice: Subject to any disclaimer, the term of this patent is extended or adjusted under 35 U.S.C. 154(b) by 617 days.

(21) Appl. No.: 17/806,856

(22) Filed: Jun. 14, 2022

(65) Prior Publication Data

US 2023/0401096 A1     Dec. 14, 2023

(51) Int. Cl.
*G06F 9/50* (2006.01)

(52) U.S. Cl.
CPC .......... *G06F 9/5016* (2013.01); *G06F 9/5022* (2013.01); *G06F 9/5044* (2013.01); *G06F 9/5083* (2013.01); *G06F 2209/5011* (2013.01)

(58) Field of Classification Search
CPC .... G06F 9/5016; G06F 9/5044; G06F 9/5022; G06F 9/5083; G06F 2209/5011; G06F 2209/509
USPC ......................................................... 718/104
See application file for complete search history.

(56) References Cited

U.S. PATENT DOCUMENTS

| | | | | |
|---|---|---|---|---|
| 2001/0010055 A1* | 7/2001 | Hirabayashi | .......... | H04L 69/329 709/201 |
| 2003/0126132 A1* | 7/2003 | Kavuri | .................. | G06F 3/0601 |
| 2004/0030643 A1* | 2/2004 | Madison | ................ | G06Q 20/10 705/39 |
| 2005/0267655 A1* | 12/2005 | Gessner | .............. | B60R 16/0231 701/29.1 |
| 2014/0013026 A1* | 1/2014 | Jannyavula Venkata | .................... | G06F 12/10 711/119 |
| 2014/0229771 A1* | 8/2014 | Horley | ................ | G06F 11/3024 714/45 |
| 2016/0041928 A1* | 2/2016 | Lesartre | .............. | G06F 12/1408 711/163 |
| 2017/0083474 A1* | 3/2017 | Meswani | ............ | G06F 12/0862 |
| 2018/0228467 A1* | 8/2018 | Waag | ..................... | A61B 8/483 |
| 2018/0307521 A1* | 10/2018 | Pinto | .................. | G06F 9/45558 |
| 2019/0013965 A1* | 1/2019 | Sindhu | ............... | H04L 12/4633 |
| 2019/0065112 A1* | 2/2019 | Schmisseur | ............ | G06F 9/505 |
| 2021/0049062 A1* | 2/2021 | Balakrishnan | ...... | G06F 11/1004 |
| 2021/0064289 A1* | 3/2021 | Kanno | .................. | G06F 3/0604 |
| 2021/0149770 A1* | 5/2021 | Doddaiah | .............. | G06N 3/044 |
| 2021/0200467 A1* | 7/2021 | Magro | ............... | G06F 12/0238 |
| 2021/0200468 A1* | 7/2021 | Wang | ..................... | G06F 3/061 |
| 2021/0224684 A1* | 7/2021 | Sarkar | .................. | G06F 16/907 |

(Continued)

*Primary Examiner* — Tuan C Dao

(74) *Attorney, Agent, or Firm* — Faegre Drinker Biddle & Reath LLP

(57) ABSTRACT

A storage system includes a host device and a heterogeneous memory pool. The host device includes an application and a memory allocator stored thereon. The heterogeneous memory pool includes a volatile or non-volatile memory component, a persistent memory component, and a computational component. The computational component is in communication with the persistent memory component and the volatile or non-volatile memory component. The host device is in communication with the heterogeneous memory pool, via the memory allocator, to offload computations from the host device to the heterogenous memory pool.

20 Claims, 18 Drawing Sheets

(56)            References Cited

U.S. PATENT DOCUMENTS

| | | | |
|---|---|---|---|
| 2021/0326216 A1* | 10/2021 | Subramanian | ........ G06F 3/0649 |
| 2021/0374056 A1* | 12/2021 | Malladi | ............. G06F 15/17331 |
| 2022/0188028 A1* | 6/2022 | Mesnier | ................. G06F 3/067 |
| 2022/0224776 A1* | 7/2022 | Doshi | ................. G06F 12/0897 |
| 2022/0405214 A1* | 12/2022 | Shen | ................... G06F 13/1642 |

* cited by examiner

1400

1402 — PREPARING, AT AN APPLICATION OF A FIRST DEVICE, A REQUEST

1404 — WRITING THE REQUEST INTO A STREAM

1406 — EXTRACTING THE REQUEST, VIA A COMPUTATIONAL COMPONENT OF A SECOND DEVICE

1408 — PROCESSING THE REQUEST, VIA THE COMPUTATIONAL COMPONENT

1410 — PREPARING A STATUS OF THE PROCESSED REQUEST

1412 — READING THE STATUS OF THE PROCESSED REQUEST, VIA THE APPLICATION

1700

SYSTEM FOR USING ALWAYS IN-MEMORY DATA STRUCTURES IN A HETEROGENEOUS MEMORY POOL

BACKGROUND

A majority of computer readable instructions that are executed by a computing device are operations that move data. Therefore, a majority of power consumption is spent not on performing relevant computations, but rather, on moving data between persistent memory and volatile memory. Such inefficiencies reduce performance of meta-data and user data operations, as well as consumer a relatively large amount of power.

It is with respect to these and other general considerations that aspects of the present disclosure have been described. Also, although relatively specific problems have been discussed, it should be understood that the embodiments should not be limited to solving the specific problems identified in the background.

SUMMARY

Aspects of the present disclosure relate to methods, system, and media for using always in-memory data structures in a heterogenous memory pool.

In some examples, a storage system is provided. The storage system includes a host device comprising and a heterogeneous memory pool. The host device includes an application and a memory allocator stored thereon. The heterogenous memory pool includes at least one of a volatile or non-volatile memory component, a persistent memory component, and a computational component. The computational component is in communication with the persistent memory component and the at least one of the volatile or non-volatile memory component. Further, the host device is in communication with the heterogenous memory pool, via the memory allocator, to offload computations from the host device to the heterogenous memory pool.

In some examples, a method of allocating persistent memory is provided. The method includes preparing, at an application of a first device, a request, writing the request into a stream, extracting the request, via a computational component of a second device, processing the request, via the computational component, preparing a status of the processed request, and reading the status of the processed request, via the application.

In some examples, a storage system is provided. The storage system includes a first device including a computational component, a second device including a computational component, and memory storing instructions that, when executed by the computational component of at least one of the first device or the second device, causes the system to perform a set of operation. The set of operations include preparing, at an application of the first device, a request, writing the request into a stream, extracting the request, via the computational component of the second device, processing the request, via the computational component of the second device, preparing a status of the processed request, and reading the status of the processed request, via the application.

In some examples, the at least one of the volatile or non-volatile memory component is volatile memory component that includes a dynamic random access memory component.

In some examples, the computational component includes a field programmable gate array that includes one or more cores.

In some examples, the application includes a management page. The management page includes metadata.

In some examples, the metadata corresponds to one or more actions to be executed, within the heterogeneous memory pool, as a result of a request from the application.

In some examples, the data corresponds to user data.

In some examples, the at least one of the volatile or non-volatile memory component, the persistent memory component, and the computational component form a stream representing a namespace identifiable by a key.

In some examples, the storage system is a database storage system.

In some examples, the stream includes at least one of a non-volatile or volatile memory component, a persistent memory component, and/or the computational component.

In some examples, the computation component includes one or more cores of a field programmable gate array (FPGA), an application specific integrated circuit (ASIC), and/or a reduced instruction set computer (RISC-V).

In some examples, the one or more cores are embedded on the second device. Further, the second device is different than the first device.

In some examples, the first device is a host device, and the second device is a storage device that includes a heterogeneous memory pool.

In some examples, the stream corresponds to a global unique identifier (GUID), and the GUID is stored in a GUID table that includes a plurality of GUIDs.

In some examples, the computational component of the first device is a central processing unit (CPU). The computational component of the second device is one or more of a field programmable gate array (FPGA), an application specific integrated circuit (ASIC), or a reduced instruction set computer (RISC-V). Further, the computational component of the second device includes one or more cores.

In some examples, the stream includes a non-volatile or volatile memory component, a persistent memory component, and the computational component of the second device.

In some examples, the first device is a host device, and the second device is a storage device that includes a heterogeneous memory pool.

In some examples, the stream is stored within the heterogeneous memory pool.

In some examples, the stream corresponds to a global unique identifier (GUID). Further, the GUID is stored in a GUID table. The GUID table is stored within the heterogeneous memory pool, and the GUID table is accessible via a memory allocator of the first device.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following FIGS.

DETAILED DESCRIPTION

Figure 1:
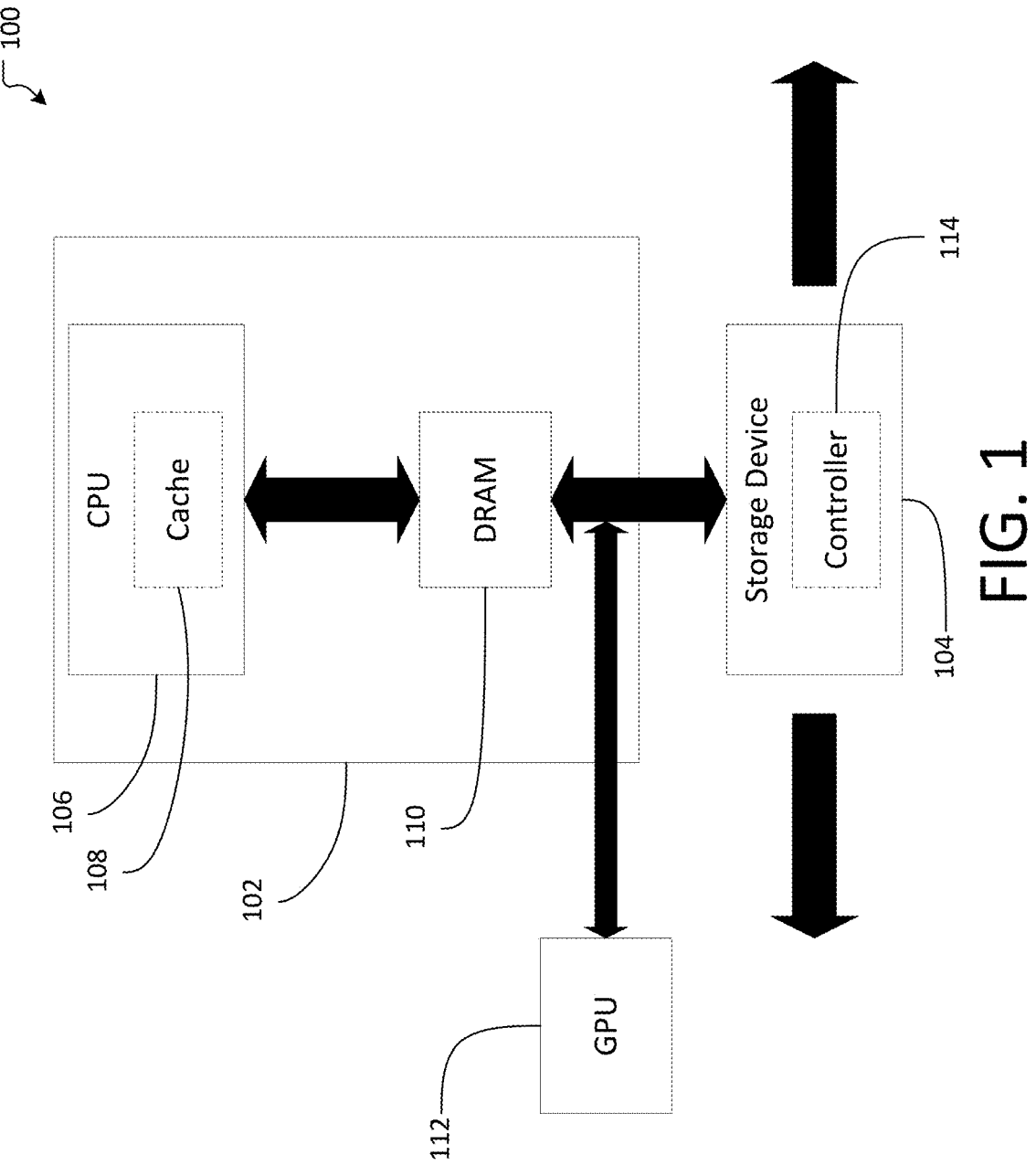
FIG. 1 illustrates an overview of a conventional storage system.

In the following Detailed Description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Various examples illustrating aspects of the present disclosure are described herein. Across examples, components may be described with similar names (e.g., application, core, memory pool, etc.). It should be recognized that components with similar names, and described in different examples, may be capable of performing similar functions or interacting with other components in similar manners. Alternatively, in some examples, components with similar names, and described in different examples, may be capable of performing different functions or interacting with different components than the earlier/later described components with the similar names.

As mentioned above, a majority of computer readable instructions that are executed by a computing device are operations that move data. Therefore, a majority of power consumption of a computing device is spent not on performing relevant computations, but rather on moving data between volatile memory and persistent memory of a computing device. Such inefficiencies reduce performance of metadata and user data operations, as well as consumer a relatively large amount of power.

The rise of big data sets in industry and the need for larger memory volumes in computing technology applications have created inefficiencies in data processing that are time-consuming and power consuming. Generally speaking, 80% of machine instructions are operations that move data from one location to another location. Therefore, the majority of power consumption in a data processing system is spent not on relevant computations, but rather on moving data and/or instructions between volatile memory and persistent memory.

Central processing unit (CPU) caches may improve data processing performance, but as a side effect, the caches need to employ complicated cache coherence protocols to achieve a consistent view of data in memory, using cores of the central processing unit. Further, CPU caches may be built on static random-access memory (SRAM) that is relatively fast, but also consumes a relatively large quantity of power. DRAM can also consume a relatively large quantity of power (e.g., since cells of DRAM are refreshed every 64 to 32 milliseconds to keep data). So, increasing a capacity of DRAM or CPU cache size can result in an increase in power consumption. On the other hand, persistent memory does not need to refresh memory cells and is therefore much more power-efficient. Some computing systems require moving data from persistent storage into dynamic random-access memory (DRAM) with the goal to access and process data by CPU cores. Persistent memory technologies continue to become faster for computations; however, modern computing systems negate the advantages being made in persistent memory technologies because of known drawbacks.

File storage systems may contain information that is stored in persistent memory. To perform actions that are based on the information stored in persistent memory, the information has to be retrieved from the persistent memory (e.g., a read operation needs to be performed), then some function may be executed based on the retrieved information, and then some result will be returned. However, conventional devices may require a relatively large amount of data transfers between persistent and volatile memory to perform actions, such as data computations or functions.

Aspects of the present disclosure address the above-mentioned deficiencies, in addition to further benefits which may be recognized by those of ordinary skill in the art. For example, using systems and mechanisms described herein, a performance of data processing can be improved by excluding overhead of file system operations to decrease an amount of data transfer operations between persistent and volatile memory. Further, in some examples, data processing can be offloaded from a host device to a storage device that includes a computational component. Further, in some examples, data can be kept in persistent memory locations without needing to perform prefetch and/or flush operations. Generally, methods and systems disclosed herein provide powerful techniques to enhance performance of data processing (e.g., database operations) by excluding the overhead of file system operations and decreasing data transfers between persistent and volatile memory.

FIG. 1 illustrates an overview of a conventional storage system 100. The system 100 include a host device 102 and a storage device 104 (e.g., a solid-state drive (SSD) or a hard disk drive (HDD)). The host device 102 may be coupled to, or otherwise in communication with, the storage device 104. The host device 102 includes a processor 106 (e.g., a central processing unit (CPU)). The processor 106 may include a cache 108. The cache 108 may store a local copy of data that is used by the processor 106 for executing functions for host device 102. The host device 102 further includes memory 110 (e.g., dynamic random-access memory (DRAM)). The processor 116 may be coupled to and/or in communication with the memory 110 to execute read and/or write instructions for data operations. The host device 102 may further be in communication with and/or include a graphical processing unit (GPU) 112. The graphical processing unit 112 may also be coupled to and/or in communication with the memory 110 to execute read and/or write instructions for data operations. The storage device 104 further includes a controller 114.

A controller, as described with respect to conventional systems discussed herein, refers to a system that may include a component, such as an application-specific integrated circuit (ASIC), that manages read and/or write operations using input-output (I/O) systems. The combination of a controller and persistent memory, as discussed with respect to FIG. 1, differs from storage devices with computational capabilities discussed below, at least because a computational storage device utilizes a computational component to perform computations, or other processing, on data that is already stored in the computational storage device. That is, the computational storage device can receive instructions to process, or perform computations, on the data in the computational storage device that is already stored at the computational storage device. As an example, one or more instructions may be sent to the computational storage device to execute some computation inside of computational storage device on data that is already stored at the computational storage device. Such data may be stored or provided to the computational storage device by means of standard I/O operations from a host or controller; however, the computational storage device is configured to receive one or more instructions, from the host for example, and perform a computation on the data, where the computation goes beyond accessing, moving, or storing the data. For example, the computational storage device may perform computations, including but not limited to Boolean computations, inference operations, arithmetic computations, etc. Alternatively, or in addition, if data is stored at the host side then, such computations may be performed at the host side. However, if the data is already stored in the computation storage, then from a computation and efficiency perspective, it makes sense to offload the computation by performing the computations via the computational storage device. In examples, a computational storage device may include a field programmable gate array (FPGA) to perform such computations.

Aspects of the system 100 may exemplify common issues that are faced using conventional data storage methods. For example, caches (e.g., cache 108) may experience cache coherence problems where data that is stored across multiple local caches are not properly synchronized as the processor 106 updates local copies of data (e.g., after performing read and/or write instructions). Further, memory (e.g., memory 110) may face a memory wall problem, such as occurs when the rate of improvement of processor performance far exceeds the rate of improvement in DRAM memory speed. Memory wall problems can be a performance bottleneck in systems operations. The system 100 may experience a throughput bottleneck as data is transferred between the host device 102 to the storage device 104. A throughput bottleneck can limit productivity and efficiency of the system 100.

System 100 may further experience data moving problems when transmitting data between the host device 102 (e.g., from memory 110) and the GPU 112. For example, transmitting data between the host device and GPU 112 may create a power consumption problem where the GPU demands a relatively large or undesirable amount of power from system 100 to receive, and/or perform operations using, data from the host device 102. Excessive data movement can reduce the lifetime of hardware components that store data (e.g., an SSD or HDD), in addition to reducing the efficiency of a system in which the data movement is occurring (e.g., system 100). Therefore, it may be beneficial to implement systems and methods in which data movement is reduced to perform desired actions or computations.

System 100 may further experience excess controller overhead at controller 114 when the controller is used to manage a relatively large amount of data operations. Generally, the storage device 104 may experience big data problems, in which relatively large amounts of data and/or metadata are stored on the storage device 104. However, computations cannot be performed on the storage device 104 because of an absence of computational power. Therefore, data may only be able to be stored persistently in the storage device 104 and must be moved between the storage device 104 and the host device 102 for computations to be performed.

Figure 2:
FIG. 2 illustrate an overview of another conventional storage system.
Figure 2:
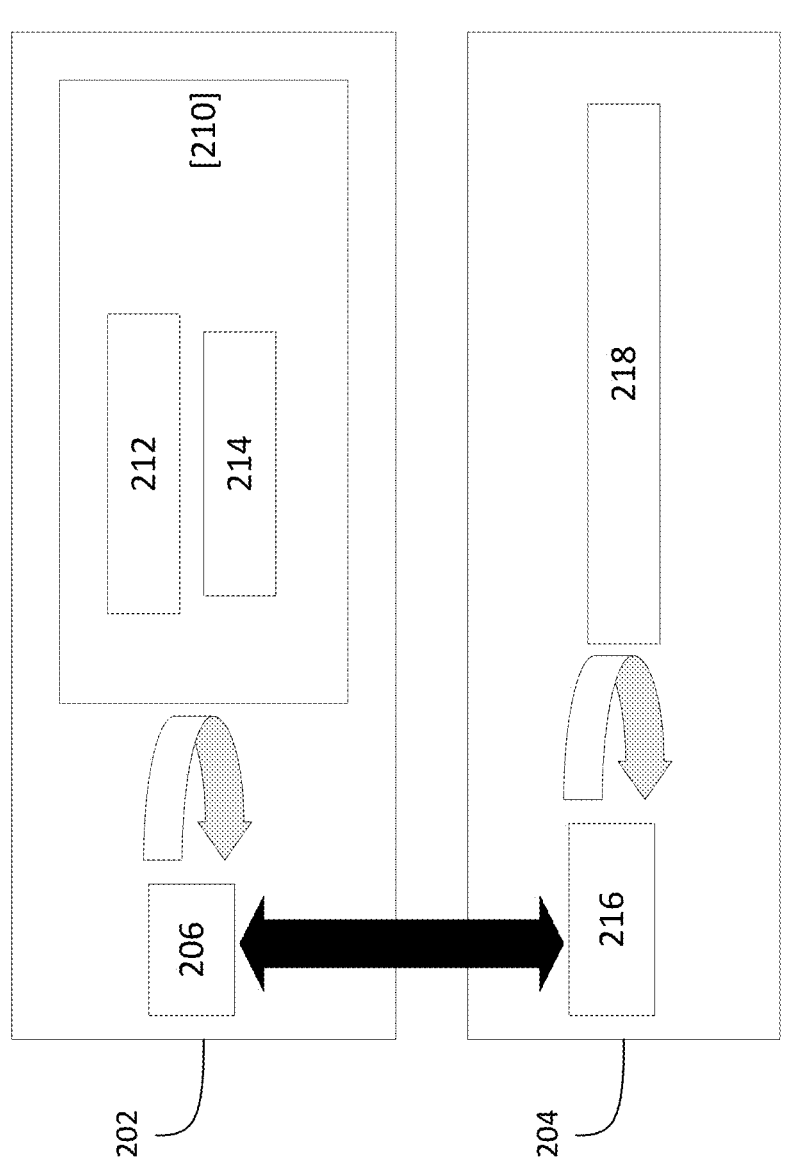

FIG. 2 illustrate an overview of another conventional storage system 200. The system 200 include a host device 202 and a storage device 204 (e.g., a solid-state drive (SSD) or a hard disk drive (HDD)). The host device 202 may be coupled to, or otherwise in communication with, the storage device 204. The host device 202 includes a processor 206 (e.g., a central processing unit (CPU)). The host device 202 further includes memory 210 (e.g., dynamic random-access memory (DRAM)). The memory 210 may include computer readable instructions corresponding to an application or application space 212. The memory 210 may further include computer readable instructions corresponding to a kernel or kernel space 214. The processor 206 may be coupled to and/or in communication with the memory 210 to execute read and/or write instructions for data operations. The storage device 204 further includes a controller 216. The controller 216 may be configured to perform read and/or write operations on persistent data 218 located within persistent memory of the storage device 204.

Current computing paradigms (e.g., system 200 of FIG. 2) imply that persistent media and operations with persistent memory are slow. As a result, using conventional techniques, DRAM (e.g., memory 210) is used to prefetch persistent data (e.g., persistent data 218) into volatile memory to process data by fast CPU cores (e.g., processor 206). However, if data is modified in the volatile memory (DRAM), then an updated state of the data needs to be flushed into persistent memory. Further, persistent memory is slower than and has greater density than volatile memory. Generally, volatile memory acts as a small window into persistent memory space, which, as mentioned, is larger, by capacity (e.g., has a greater density).

Figure 3:
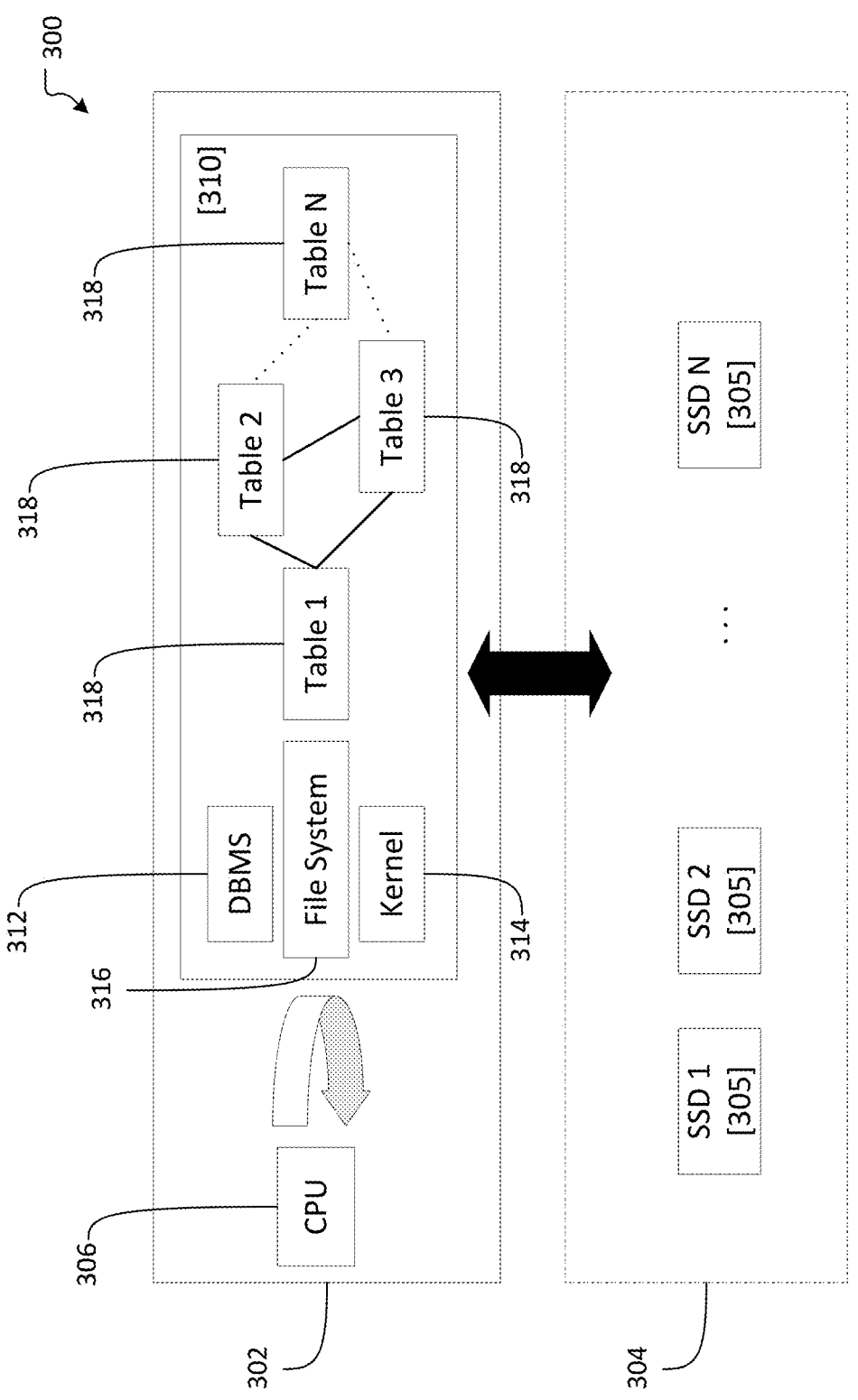
FIG. 3 illustrates an overview of a conventional database storage system.

In the storage system 200, application 212 allocates a piece of volatile memory 210, by virtue of a memory allocator, to prefetch allocated memory, by data, from persistent media of storage device 204. However, a capacity of DRAM (e.g., the volatile memory 210) is not large enough to store all of the data being processed. As a result, a significant amount of data operations performed by conventional storage systems (e.g., system 200) generate an intensive exchange of data between DRAM and persistent memory. Such data operations are inefficient for storage systems because a relatively large amount of power consumption is spent not on computations, but rather on moving data between DRAM and persistent memory (which may each be on separate devices). Furthermore, the intensive exchange of data between DRAM and persistent memory increases a probability of data being lost, in the event of a shut down due to power issues, file system corruption, malfunctioning, or failure of the storage system FIG. 3 illustrate an overview of a conventional database storage system or database system or system 300. A database is an example use-case of a storage system. The system 300 include a host device 302 and a storage device 304. The storage device 304 includes persistent memory, such as, for example, one or more solid-state drives (SSD) 305. The host device 302 may be coupled to, or otherwise in communication with, the storage device 304. The host device 302 includes a processor 306 (e.g., a central processing unit (CPU)). The host device 302 further includes memory 310 (e.g., volatile memory, such as dynamic random-access memory (DRAM)). The processor 306 may be coupled to and/or in communication with the memory 310 to execute read and/or write instructions for data operations. The memory 310 may include, stored therein, a database management system (DBMS) 312, a kernel 314, a file system 316, and/or one or more tables 318. The tables 318 may be part of the DMBS 312. For example, the tables 318 may be allocated in the memory 310 by the DBMS 312.

A database system, such as database system 300, may be a use-case of a storage system. The database system 300 requires, ideally, that all of the contents of the one or more tables 318 are stored in the volatile memory 310. For example, the database system 300 may require that all of the one or more tables 318 are stored in the volatile memory 310 because data search or data modification operations may require being able to access a plurality of tables and data records, at the same time, especially in multi-threaded applications. However, even if it is possible to prefetch and keep all of the database tables 318 in the volatile memory 310, further issues arise. For example, any modifications to the tables 318 should be made persistent as fast as possible, thus resulting in intensive data exchanges between the volatile memory 310, and the persistent memory 305. Such intensive data exchanges reduce performance of the system 300, and are therefore undesirable. Furthermore, an atomicity, consistency, isolation, and durability (ACID) model will degrade performance of database operations, even if all of the database tables are completely stored in DRAM.

Figure 4:
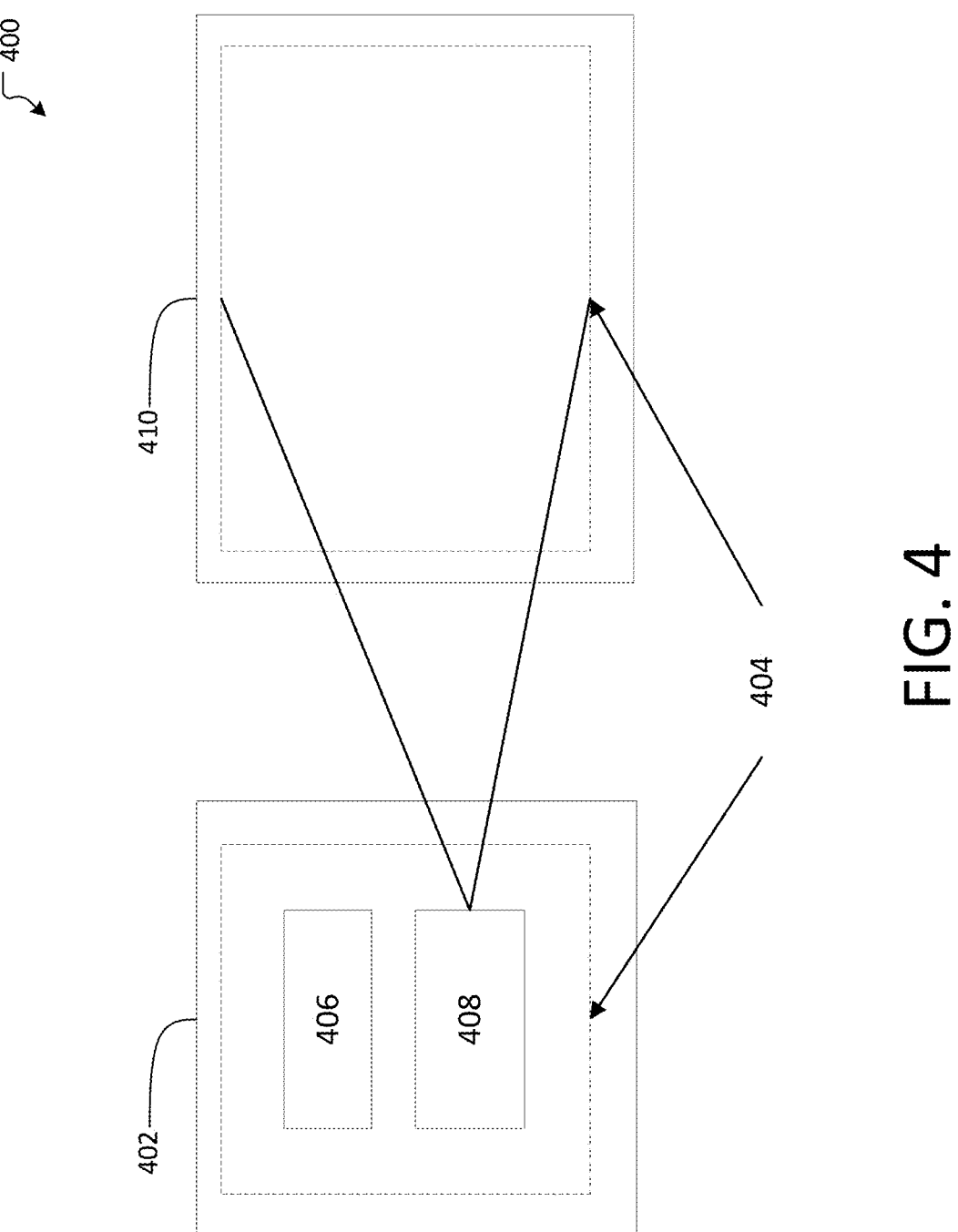
FIG. 4 illustrates an example system, according to some aspects described herein.

FIG. 4 illustrates an example system 400 for using always in-memory data structures in a heterogenous memory pool, according to some aspects described herein. The system 400 includes a host device 402. The host device includes an address space 404. The address space 404 includes a main memory 406, and an additional memory space or additional space 408. The additional memory space 408 forms, or forms at least part of, a memory pool 410.

Using the memory pool 410, the host device's 402 address space 404 can be extended by a relative large amount of byte-addressable, fast, and persistent memory. Aspects of system 400 provide mechanisms to access and/or modify data directly in persistent space, without needing to prefetch data into volatile memory (e.g., DRAM) and to flush a modified state of the data into persistent memory. Furthermore, such aspects are promising for improving performance of storage systems, especially for database storage systems, as well as reliability of database operations, even in instances where configurations rely upon the ACID model of operations with data.

Figure 5:
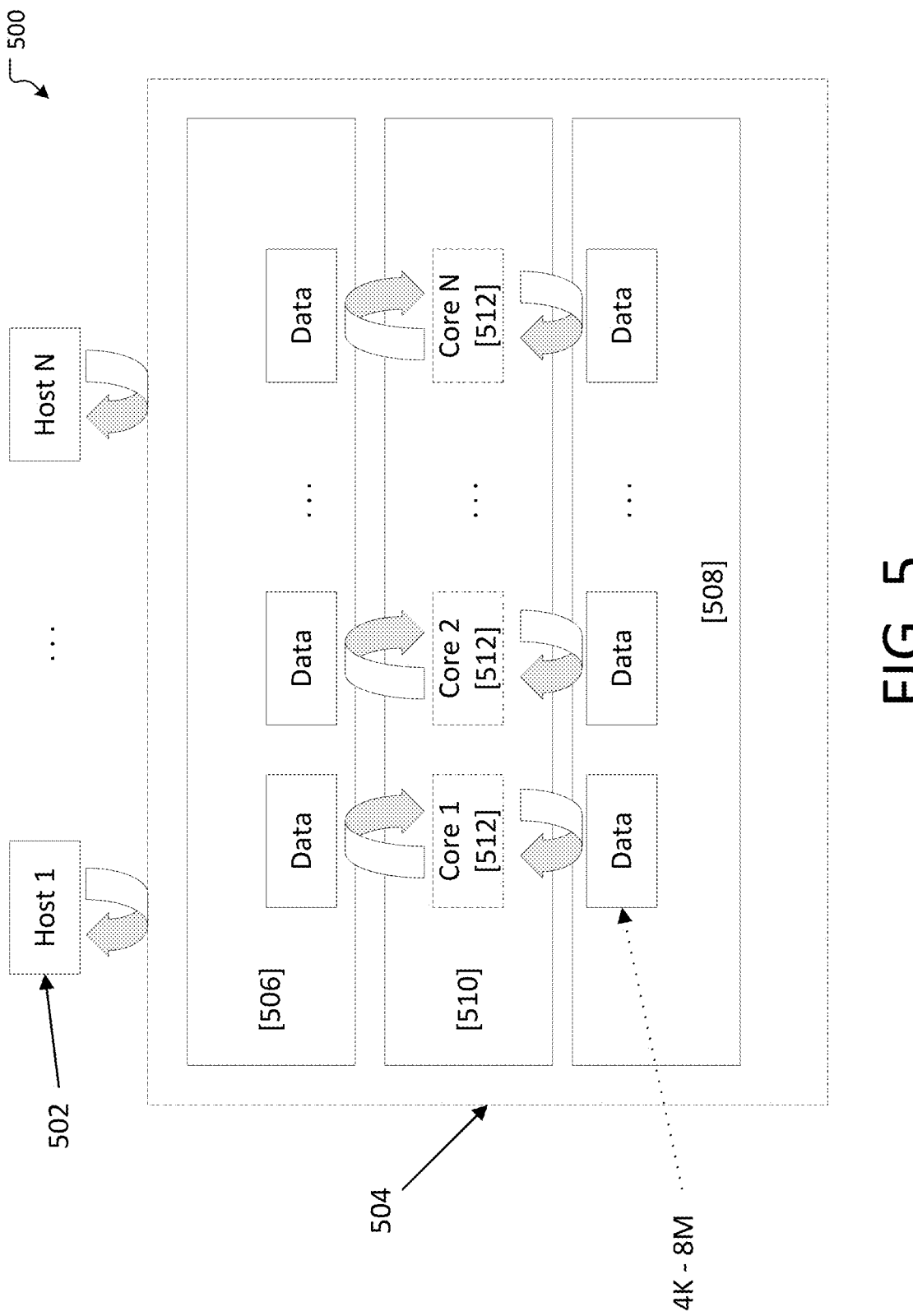
FIG. 5 illustrates an example system, according to some aspects described herein.

FIG. 5 illustrates an example system 500 for using always in-memory data structures in a heterogenous memory pool, according to some aspects described herein. The system 500 includes a host device 502 and a heterogeneous memory pool 504 with embedded computation. The host device 502 may be coupled to, or otherwise in communication with, the heterogeneous memory pool 504. The heterogeneous memory pool 504 includes a plurality of memory components, such as, for example, a first memory component 506, and a second memory component 508. In some examples, the first memory component 506 may include nonvolatile memory (NVM). Additionally, or alternatively, in some examples, the first memory component 506 may include volatile memory, such as, for example, DRAM. The second memory component 508 may include persistent memory.

The heterogeneous memory pool 504 may further be embedded with one or more computational components, such as, for example, a field programmable gate array (FPGA) 510. The FPGA 510 may include one or more cores 512. The cores 512 may extract data from the first memory component 506 and/or the second memory component 508 to perform read/write operations. Further, in some examples, the cores 512 may be configured to perform computational operations (e.g., Boolean operations, inference operations, arithmetic operations, etc.) on data stored in the first memory component 506 and/or the second memory component 508.

Several advantages of increasing a host device's address space were discussed earlier herein with respect to system 400 of FIG. 4. However, mechanisms described herein provide further advantages than those discussed herein, or recognized by those of ordinary skill in the art, for increasing memory capacity. For example, increasing memory capacity ends with increasing the latency of memory access. A processor of a host device, such as a CPU core, cannot access all of the address ranges of an expanded address space with the same latency as a non-expanded address space, since conventional memory chips are often grouped in non-uniform memory access (NUMA) nodes that can be accessed by CPU cores with different latency. In such respects, physical distance defines the latency to access one or more NUMA nodes. Furthermore, data processing performance may not be improved significantly in the case of a CPU-centric model because of memory wall problem, cache coherence protocol, and limitations to an increase in the number of cores in one CPU socket.

Aspects of the present disclosure address the above-referenced deficiencies and more. For example, data-centric or memory-centric computing, described in accordance with aspects disclosed herein may resolve the above-mentioned deficiencies. Referring specifically to the example system 500 of FIG. 5, the FPGA 510 is a computational component embedded with the memory pool 504 to enable data-centric or memory-centric computing. Specifically, computing power can be delivered into the persistent memory 508, using the one or more cores 512 of the FPGA 510. As a result, operations with data in persistent memory can be offloaded by a host's CPU (e.g., a CPU of host device 502) into a heterogeneous memory pool (e.g., heterogeneous memory pool 504) with embedded computational components (e.g., FPGA 510).

Figure 6:
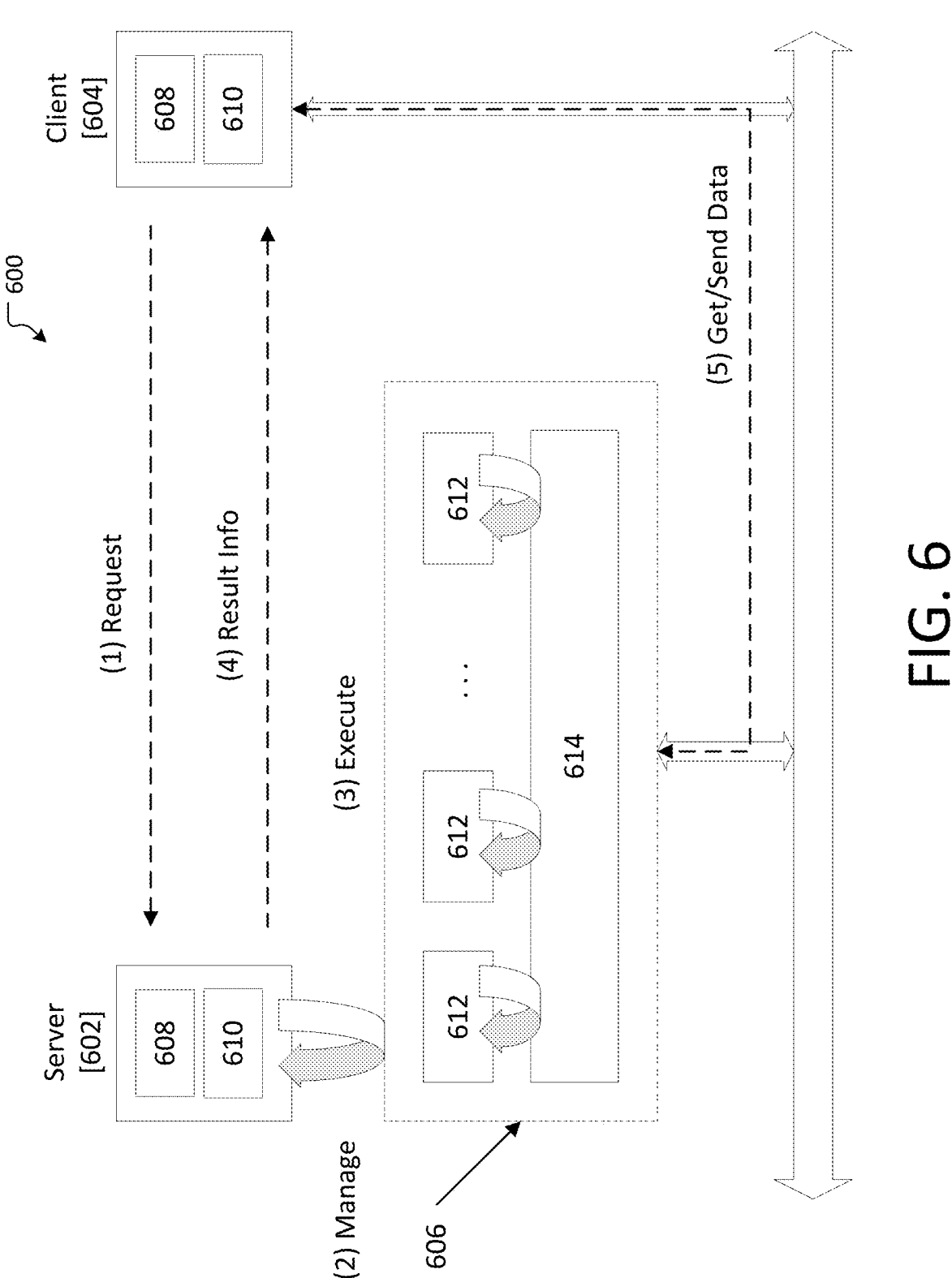
FIG. 6 illustrates an example database model, according to some aspects described herein.

FIG. 6 illustrates an example database model 600, according to some aspects described herein. The model 600 includes a server 602, a client 604, and a memory space or pool 606. The server 602 includes a processor, such as a CPU 608, and a volatile memory component, such as DRAM 610. The client include a processor, such as a CPU 608, and a volatile memory component, such as DRAM 610. The memory space 606 includes a computational component, such as one or more data processing units (DPU) 612, and a persistent memory component 614.

A database use-case is one example use-case with which mechanisms described herein can be employed to offload computation from a host-device to a storage device. Usually, any database management system can be based on client-server architecture. For example, the client 604 sends SQL requests to the server side 602. The responsibility of the server 602 is to execute the received SQL requests with the goal of servicing many clients 604. Generally, execution of SQL requests can be offloaded into the memory pool 606, using mechanisms described herein. An advantage of mechanisms disclosed herein is that a computational load of processing data can be distributed across a plurality of computational component cores (e.g., cores of an FPGA, or cores of the DPU 612), inside of the memory pool 606. As a result, a performance of data processing can be significantly enhanced because of elimination of data moving into DRAM of the host, and by massively parallel data processing performed by a plurality of computational component cores.

Figure 7:
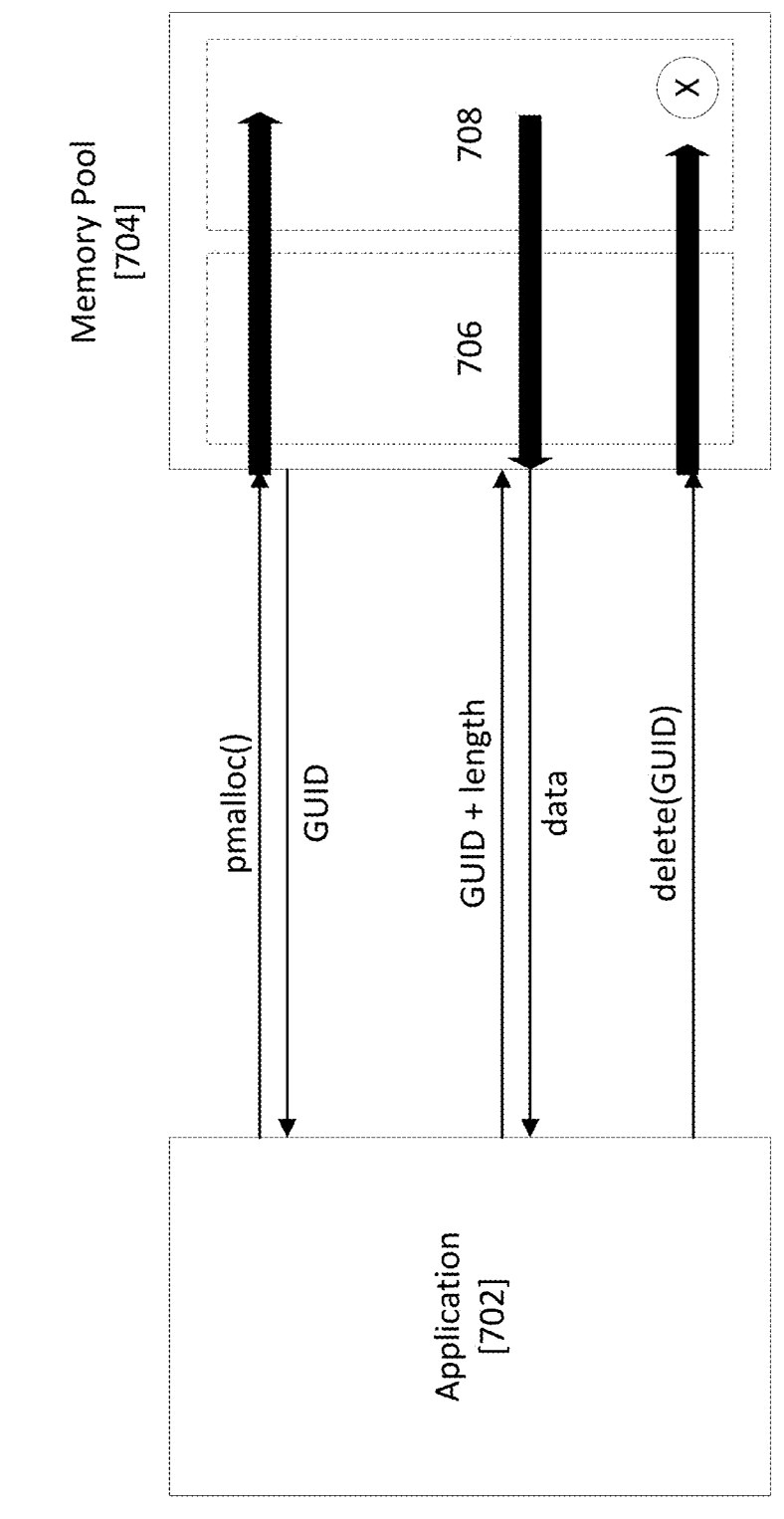
FIG. 7 illustrates an examples persistent memory model, according to some aspects described herein.

FIG. 7 illustrates an example persistent memory model 700, according to some aspects described herein. The model 700 includes an application 702 (e.g., an application stored in memory of a host device), and a memory pool 704. The memory pool 704 can include a plurality of memory components, such as, a first memory component 706 and a second memory component 708. The first memory component 706 may be a volatile memory component, such as DRAM. The second memory component 708 may be a non-volatile memory component.

Usually, applications need to create files in memory to store data persistently. The main operations associated with persistent data include any of create, open, write, and close file operations. Also, operations with files can be block-based. Block-based means that systems need to read and/or write 4K physical sectors even if they need to access or modify 1 byte of data. However, applications can allocate and access volatile memory on the basis of smaller granularity (e.g., smaller than 4K). Still, that application may need to allocate memory, open a file, and prefetch data from the file into an allocated memory to access and/or modify the data. Generally, the open file and prefetch data operations can add significant overhead and decrease data processing performance significantly, especially for fast non-volatile memory.

Mechanisms disclosed herein, for example with respect to FIG. 7, address the above-described deficiencies. For example, model 700 allows for the exclusion of overhead corresponding to open file and prefetch data operations, by allocating, accessing, and modifying data directly in persistent byte-addressable memory (e.g., within memory pool 704). Accordingly the application 702 can allocate persistent memory in a similar manner that conventional applications may allocate volatile memory. Moreover, the allocated persistent memory can be available for the application 702, even after the application 702 restarts. Files may be used to keep data persistently, and name may be the basis to find and identify the files. For example, allocated persistent memory can be identified by globally unique identifiers (GUIDs), and names of namespaces can be used to convert a name into a GUID.

Referring specially to FIG. 7, persistent memory may be allocated via "pmalloc( )". Then, a GUID may be identified by the allocated persistent memory. Further, a GUID and a length can be transmitted from the application 702 to the memory pool 704 to receive corresponding data. Further, in some examples, an allocated portion of persistent memory may be freed, such as, for example, via the "delete(GUID)" command, as shown in FIG. 7. In some examples, several application instances may access and/or be allocated a same portion of memory (e.g., of memory pool 704), and every application may then have the same GUID for the shared memory portion. Additionally, or alternatively, several application instances may access and/or be allocated different portions of memory, and each application may then have differed GUIDs for respective memory portions. Regardless, the memory pool 704 may have reference counters for each allocated memory portion. The "delete(GUID)" command or operation may decrease the reference counter, such that if the reference counter become equal to zero, then the persistent memory portion, to which one or more application instances was allocated, can be freed.

Figure 8:
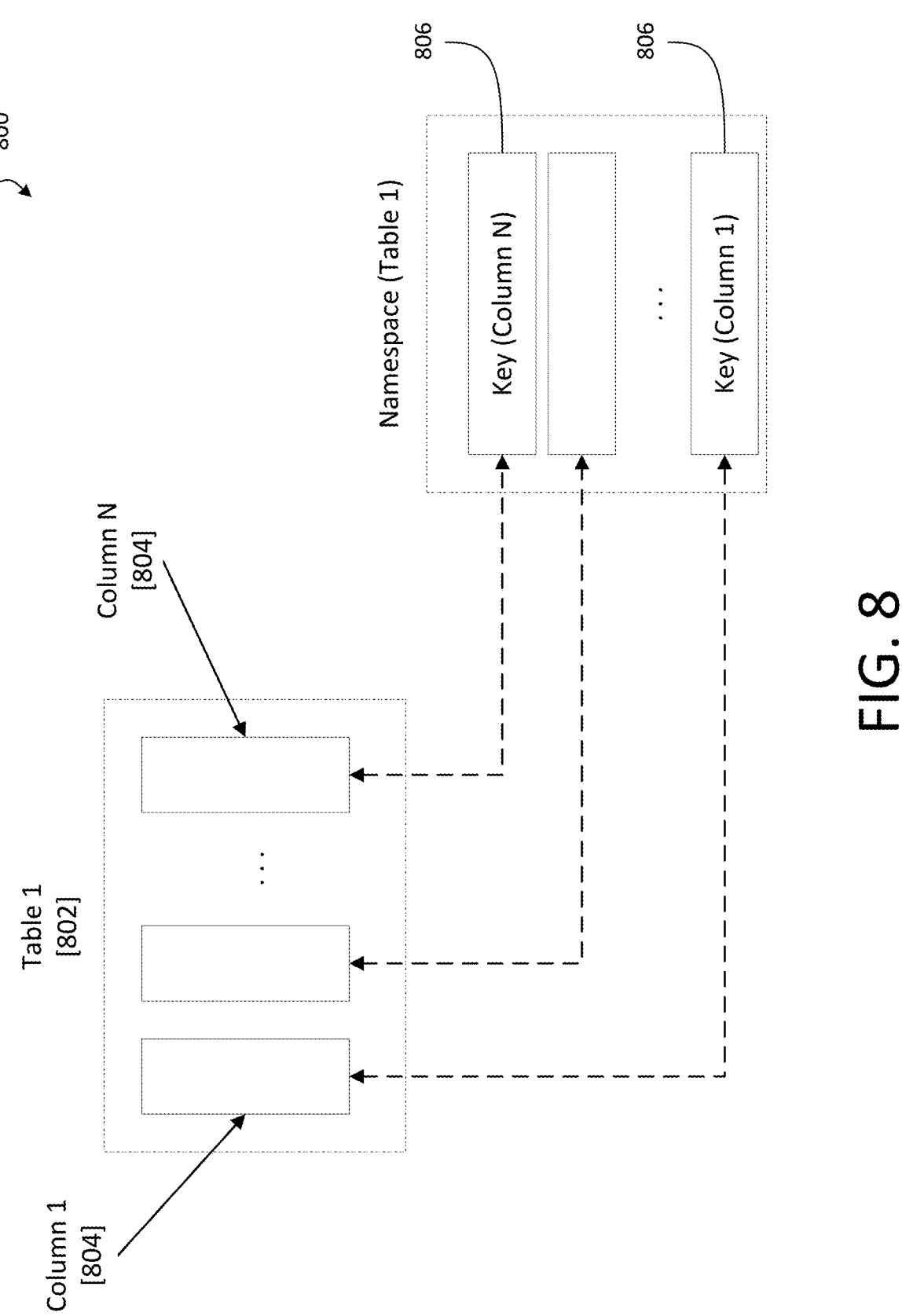
FIG. 8 illustrates an example namespace model, according to some aspects described herein.

FIG. 8 illustrates an example namespace model or namespace 800, according to some aspects described herein. A database may contain tables, and tables can be imagined like namespaces that contain columns. Every column can be identified as another namespace, or as a stream that contains records. Further, every stream can be identified by a name that can be treated like a key. As a result, any application can group some related data into namespaces that can be used to allocate persistent memory. The namespaces can be split into a number of stream, and each stream can be designated to keep items or records of the same size.

For examples, referring specifically to FIG. 8, the namespace 800 includes one or more tables 802. Each of the tables 802 can include one or more columns 804. Every one of the columns 804 can be identified as a stream with a name or key 806. Accordingly, any application can (e.g., application 702) can group some related data into namespaces, using mechanisms described herein.

Generally, heterogeneous memory pools can provide the ability to create namespaces. Applications can create streams in the namespaces. Further, each stream can gather data records of the same type and granularity. For example, namespaces can represent table instances or object instances. A stream can be a portion of memory or a heap that is allocated to keep items of the same size. Alternatively, it is considered that a stream can be a portion of memory or a heap that is allocated to keep items of variable sizes (e.g., as may be implemented with additional metadata in the stream).

Figure 9:
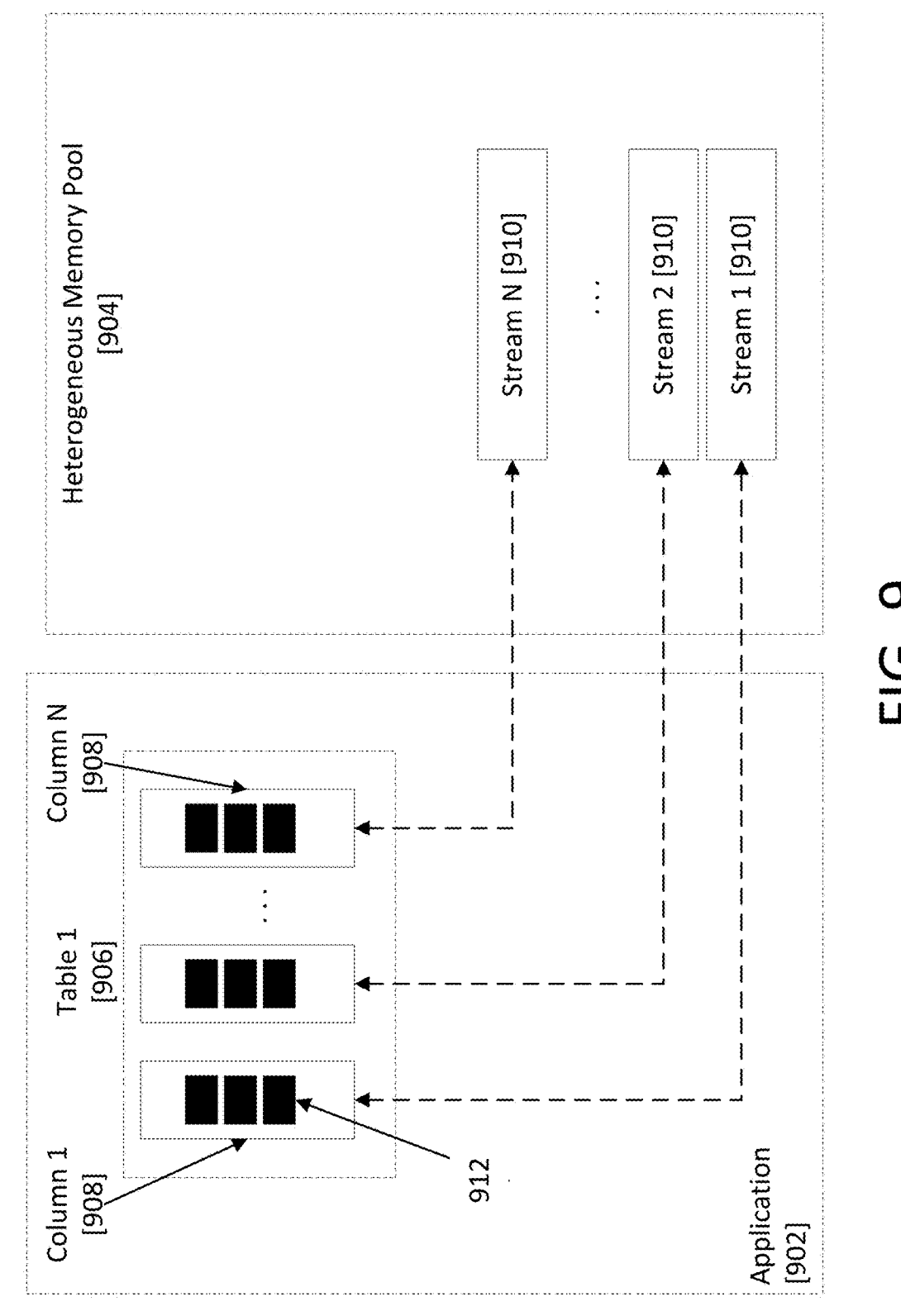
FIG. 9 illustrates an example database model, according to some aspects described herein.

FIG. 9 illustrates an example database model 900, according to some aspects described herein. Generally, the database model 900 illustrates streams for a heterogeneous memory pool. The model 900 includes an application 902 (such as that may be stored in memory of a host device) and a heterogenous memory pool 904. The application 902 includes one or more tables 906 that each contain one or more columns 908. The one or more columns 908 may each correspond to a respective stream 910 located (e.g., stored) in the heterogenous memory pool 904. The one or more columns 908 may each include one or more records 912, such as records of data transactions.

Streams, such as streams 910, are the combination of persistent memory (that can be represented by NAND flash, nonvolatile memory, or storage class memory), dynamic random access memory (DRAM) or non-volatile random access memory (NVRAM), and field programmable gate array (FPGA) cores. The responsibility of persistent memory is to keep data persistently. However, data in persistent memory can be accessed and/or modified on NAND flash or block basis (as discussed earlier herein). Further, persistent memory may have a larger capacity than DRAM or NVRAM buffer. Persistent memory can play the role of a main large space of a stream. However, DRAM and/or NVRAM can play the role of a small buffer that can store currently requested or modified pieces of data. Generally, DRAM and/or NVRAM buffers can be a small window into the larger persistent memory space.

The DRAM and/or NVRAM buffer can be structured as request queues that an application (e.g., application 902) can use to request data access or modifications. For example, a computational component, such as FPGA cores, can take memory pages or requests from DRAM/NVRAM buffers and execute the requested operations within a heterogeneous memory pool with which the computational component is embedded. The requested operations can include reading data from persistent memory and preparing an actual state of the data in a DRAM buffer. The requested operations can further include storing in persistent memory modifications that are executed by a host device. The requested operations can further include executing computations, via a computational component, such as FPGA cores, on data stored in persistent memory. For example, the computations can be Boolean computations, inference operations, arithmetic computations, and/or any other data manipulation computations, beyond simple read and write operations, that may be recognized by those of ordinary skill in the art.

Figure 10:
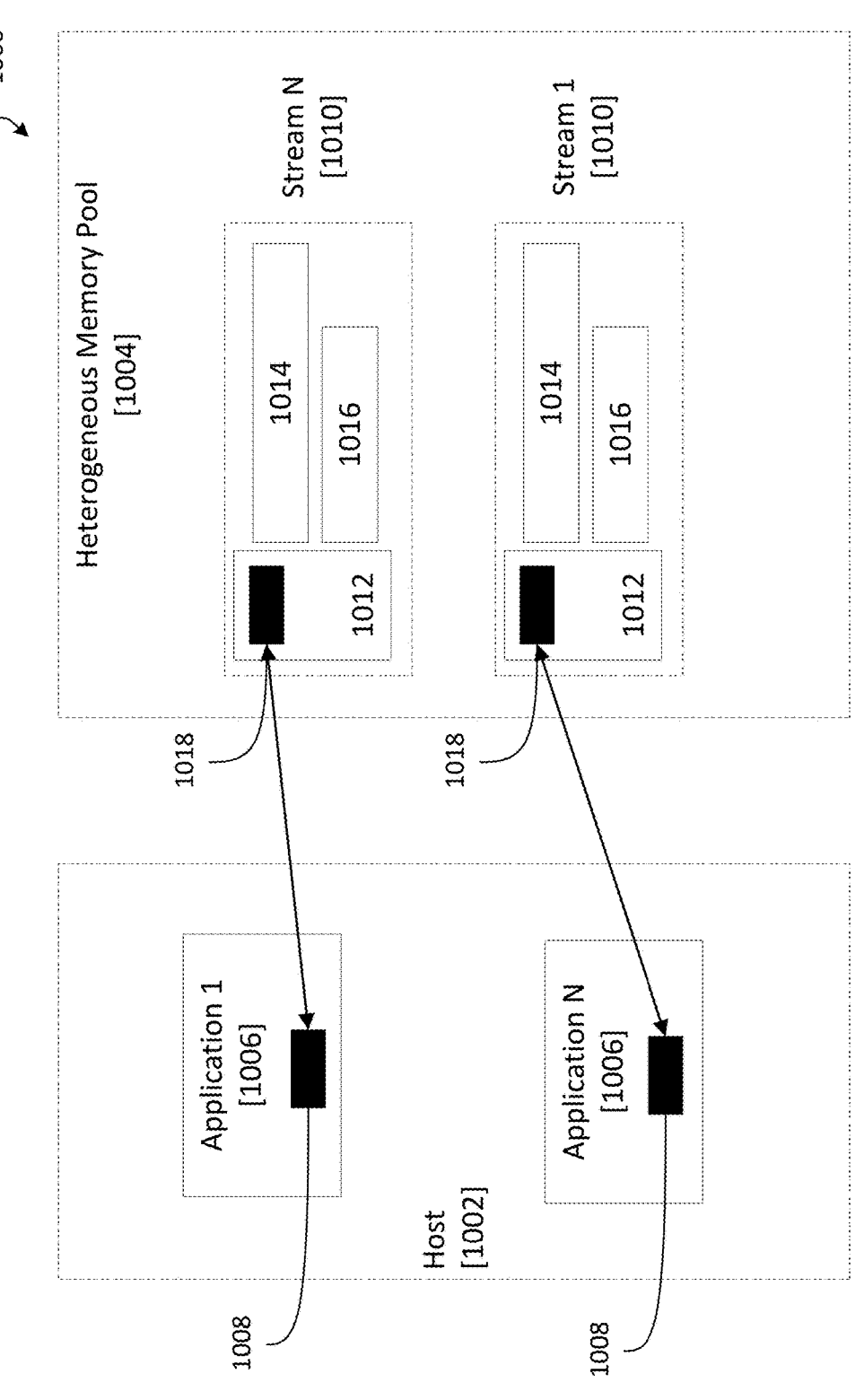
FIG. 10 illustrates an example database model, according to some aspects described herein.

FIG. 10 illustrates an example database model 1000, according to some aspects described herein. Generally, the database model 1000 illustrates an architecture of streams. The model 1000 includes a host device 1002 and a heterogenous memory pool 1004. The host device 1002 includes one or more application 1006 that each have a memory buffer or buffer or range of addresses 1008. The one or more applications 1006 may comprise a plurality of applications 1006. The heterogeneous memory pool 1004 includes one or more streams 1010. The one or more streams 1010 may comprise a plurality of streams 1010. The one or more streams 1010 each include a volatile memory (e.g., DRAM) or non-volatile memory (e.g., non-volatile random access memory) component 1012, a persistent memory component 1014, and a computational component (e.g., FPGA cores) 1016.

The applications 1006 can see each stream 1010 like a memory address range that has a size of allocated persistent memory within the persistent memory component 1014. The volatile and/or non-volatile component 1012 represents a small buffer that can map any memory page of persistent memory that the application 1006 would like to access at a given moment in time. The volatile and/or non-volatile component 1012 can be treated like a requests queue in the form of memory pages. The volatile and/or non-volatile memory component 1012 can include a buffer 1018 that corresponds to the buffer 1008 of one of the applications 1006 corresponding to one of the streams 1010.

The application 1006 can prepare memory pages with metadata and data in the buffer 1008. In some examples, an application (e.g., application 1006) can see the buffer 1008 as an address range (e.g., corresponding to the buffer 1018) in the volatile and/or non-volatile component 1012. Therefore, the host does not need to allocate DRAM on the host side 1002 for the buffer 1008. Rather, every memory access request can be redirected into the memory pool 1004. Further, metadata can be prepared, prior to executions and/or read/write barriers can be implemented to prevent the computational component 1016 from an early reaction due to a new state of the buffer 1008. Alternatively, in some examples, an application (e.g., application 1006) can see buffer 1008 as a cache in the a DRAM of the host side 1002. Therefore, initially, an application may store metadata and/or data in the buffer 1008, then some machine instructions (e.g., memory flush) may store buffer 1008 into buffer 1018. Such machine instructions may imply a request to fulfill computations within the heterogenous memory pool 1004 by the computational component 1016.

A write operation in the page can imply that a request must be processed by the computational component 1016 (e.g., FPGA cores). Metadata in the prepared memory page of the buffer 1008 can instruct the computational component 1016 to execute a command with data stored in the persistent memory 1014. As a result, requests could require that data be searched and/or extracted from the persistent memory 1014 and/or some modification should be made to the data stored in the persistent memory 1014. Further, the computational component 1016 can prepare new states of memory pages in the nonvolatile and/or volatile memory component 1012 as a result of the executed operation. The application 1006 can read and/or access the result of the executed operation from the memory page in the buffer 1008 corresponding to the buffer 1018.

The application 1006 can perform read requests using one of a plurality of different implementations. Specifically, the application 1006 can see a new state of buffer 1018 through buffer 1008. If buffer 1008 is simply a range of memory addresses corresponding to buffer 1018, then read operations from buffer 1008 by the application 1006 may retrieve a state of memory pages in buffer 1018. However, if buffer 1008 is a memory buffer in the host 1002, then buffer 1008 and buffer 1018 may be synchronized, since buffer 1018 is the memory page(s) within the heterogenous memory pool 1004. It is considered that a page fault mechanism may be employed in an operating system kernel, such that by flushing a state of buffer 1008 into buffer 1018, a page on the host side 1002 is freed. Therefore, every read request may require a new page to be allocated and for the state of buffer 1018 to be read into buffer 1008. Additionally, or alternatively, a hardware approach for read requests may be implemented. For example, every flushed memory page can be marked by a special flag. Based on the special flag, hardware may redirect read requests to the heterogenous memory pool 1004, and in some examples, may redirect read requests specifically to the buffer 1018. Once an operation or function is completed, memory pages in the buffer 1018 of the non-volatile and/or volatile memory component 1012 can be re-used for another request of the application 1006.

Figure 11:
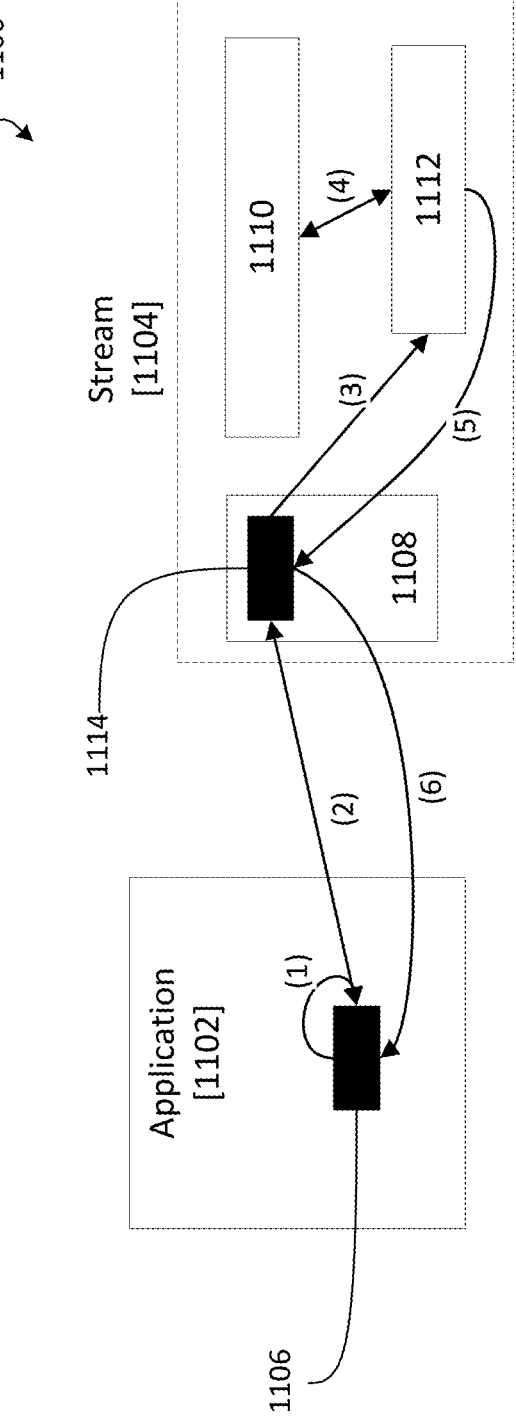
FIG. 11 illustrates an example flow between an application and memory stream, according to some aspects described herein.

FIG. 11 illustrates an example flow 1100 between an application 1102 and a memory stream or stream 1104. The application 1102 may include a buffer 1106 in which memory pages may be stored. Alternatively, the buffer 1106 may be a range of addresses, as discussed further below. The stream 1104 may include a volatile and/or nonvolatile memory component (e.g., DRAM) 1108, a persistent memory component 1110, and a computational component 1112 (e.g., FPGA cores). The volatile and/or nonvolatile memory component 1108 may include a memory pool buffer 1114 that corresponds to the buffer 1106 of the application 1102. Still referring to FIG. 11, at (1), the application 1102 may prepare a management page. The management page may be prepared by a processer of a host device. Further the management page may be stored in the buffer 1106. In some examples, an application (e.g., application 1102) can see the buffer 1106 as an address range (e.g., buffer 1018) in the volatile and/or non-volatile component 1108. Therefore, the host does not need to allocate DRAM on a host side (e.g., on which application 1102 is located and/or running thereon), for the buffer 1106. Rather, every memory access request can be redirected into the stream 1104. Further, metadata can be prepared, prior to executions and/or read/write barriers can be implemented to prevent the computational component 1112 from an early reaction due to a new state of the buffer 1008. Alternatively, in some examples, an application (e.g., application 1102) can see buffer 1106 as a cache in the a DRAM of the host side. Therefore, initially, an application may store metadata and/or data in the buffer 1106, then some machine instructions (e.g., memory flush) may store buffer 1106 into buffer 1108. Such machine instructions may imply a request to fulfill computations within the stream 1104 by the computational component 1112.

At (2), the application 1102 may write the management page into the stream 1104. Specifically, the application 1102 may write the management page into the stream 1104 from the buffer 1106 of the application, to the buffer 1114 of the stream 1104. The application 1102 can perform write requests using one of a plurality of different implementations. Specifically, the application 1102 can update a state of buffer 1114 through buffer or range of addresses 1106. If buffer 1106 is simply a range of memory addresses corresponding to buffer 1114, then write operations from buffer 1106 by the application 1102 may update a state of memory pages in buffer 1114. However, if buffer 1106 is a memory buffer in a host (e.g., on which application 1102 is running), then buffer 1106 and buffer 1114 may be synchronized, since buffer 1114 is the memory page(s) within the stream 1104. It is considered that a page fault mechanism may be employed in an operating system kernel, such that by flushing a state of buffer 1106 into buffer 1108, a page on the host side is freed. Therefore, every write request may require a new page to be allocated and for the state of buffer 1106 to be written into buffer 1114. Additionally, or alternatively, a hardware approach for write requests may be implemented. For example, every flushed memory page can be marked by a special flag. Based on the special flag, hardware may redirect write requests to the stream 1104, and in some examples, may redirect write requests specifically to the buffer 1114.

At (3), the computational component 1112 (e.g., FPGA cores) extract the management page (e.g., a request) from the volatile and/or non-volatile memory component 1108. Metadata of the management page for one computational component (e.g., one FPGA core) can be smaller than a 4K memory page. Specifically, the metadata of the management page could be 32 or 64 bytes. Therefore, a 4K memory page can contain management metadata structures of 32 or 64 bytes. Accordingly, one memory page can manage activity of 32 or 64 FPGA cores. Further, metadata of the management page may describe characteristics and location of user data in persistent memory or in a request itself.

At (4), the computational component 1112 processes the request. For example, the computational component 1112 may perform a computational function (e.g., Boolean computation, inference operations, arithmetic computation, etc.) on data stored in the persistent memory component 1110. Alternatively, the computational component 1112 may perform a conventional read and/or write command on data stored in the persistent memory component 1110.

At (5), the computational component 1112 prepares a status of the request (e.g., corresponding to the extracted management page). As discussed above, the management page can contain statuses for several FPGA cores, due to 32 or 64 byte metadata structures contained by the management page. In some examples, the status of the request may be the result of a computation or function executed by the computation component 1112. At (6), the application 1102 reads the status of the request that was processed by the computational component 1112.

The application 1102 can perform read requests using one of a plurality of different implementations. Specifically, the application 1102 can see a new state of buffer 1114 through buffer 1106. If buffer 1106 is simply a range of memory addresses corresponding to buffer 1114, then read operations from buffer 1114 by the application 1102 may retrieve a state of memory pages in buffer 1114. However, if buffer 1106 is a memory buffer in a host (e.g., on which application 1102 is running), then buffer 1106 and buffer 1114 may be synchronized, since buffer 1114 is the memory page(s) within the stream 1104. The read application 1102 may be implemented using hardware or software consistent with mechanisms disclosed herein.

Additionally, or alternatively, the host may try to check a result of a computation being performed within the stream 1104, before the computation is finished because a speed of operations may differ between the stream 1104 and the application 1102. It is considered that the stream 1104 may generate interrupt signals or other signals that may be sent to the host at the end of a computation, such as via one or more particular computational components 1112 (FPGA cores). Additionally, or alternatively, polling can be performed, wherein a CPU of a host device (e.g., on which application 1102 is configured to run) can try to read states of memory pages from the buffer 1114 multiple times.

Applications (e.g., application 1102) can identify namespaces (as described earlier herein) by means of human-friendly names. However, a heterogeneous pool may associate a namespaces name with a corresponding global unique identifier (GUID). These associations can be stored in a special GUID table. If an application would like to create or access a namespace, then the application may provide the namespace's name, and the heterogeneous memory pool may try to locate the name in a GUID table. As a result, the GUID table may return a virtual address corresponding to an existing namespace, or may allocate address space to create a new namespace. Such a process is described in further detail below.

Figure 12:
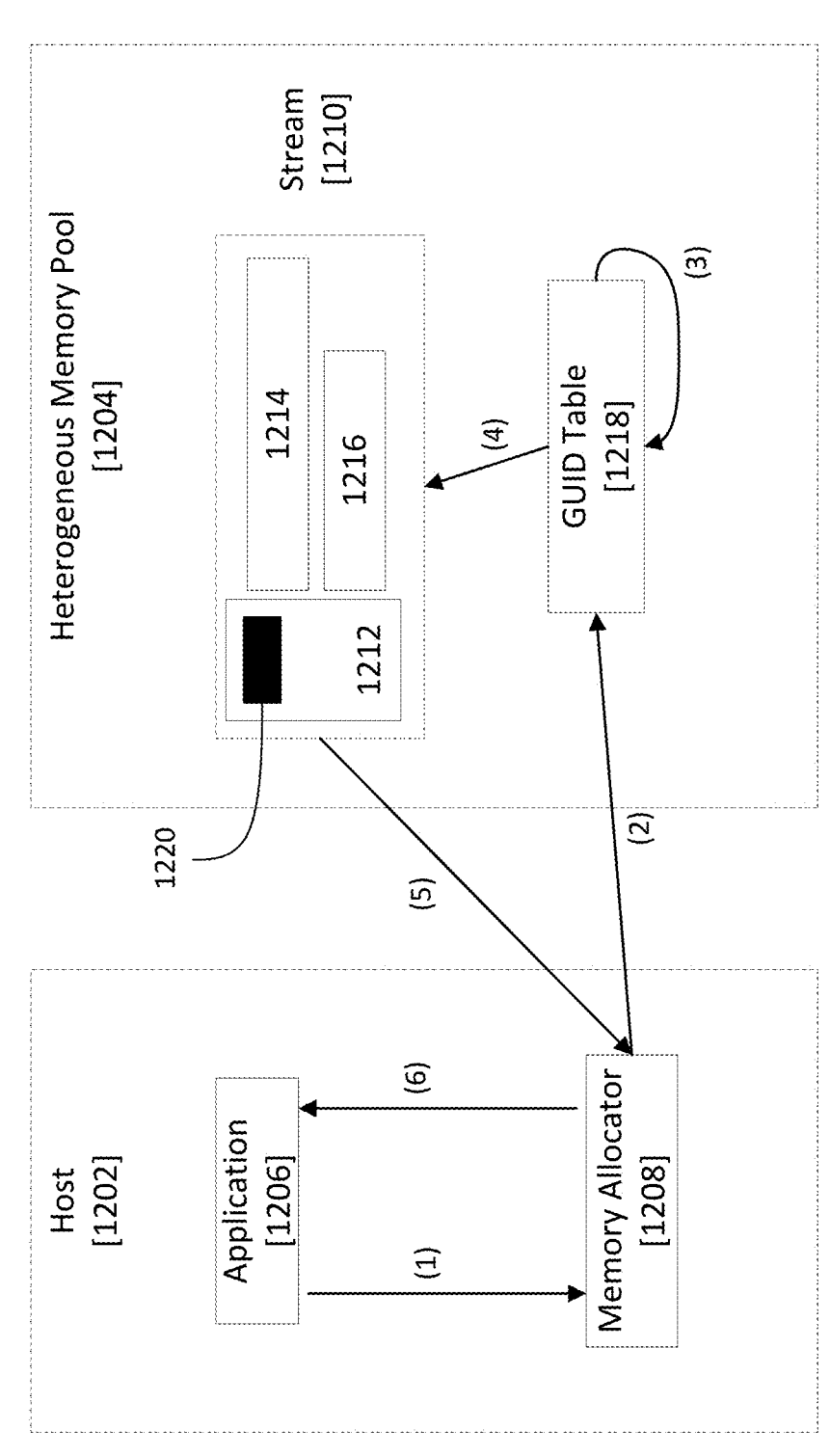
FIG. 12 illustrates an example flow of persistent memory allocation, according to some aspects described herein.

FIG. 12 illustrates an example flow 1200 of persistent memory allocation. The flow 1200 extends between aspects of a host device or host 1202 and a heterogeneous memory pool or memory pool 1204. The host 1202 includes one or more applications 1206 and one or more memory allocators 1208. The memory pool 1204 includes one or more streams 1210. The one or more streams 1210 can include a volatile and/or nonvolatile memory component (e.g., DRAM) 1212, a persistent memory component 1214, and a computational component 1216 (e.g., FPGA cores). The memory pool 1204 may include a GUID table 1218. Further, the volatile and/or nonvolatile memory component 1212 may include a memory pool buffer 1220 that corresponds to the memory allocator 1208 of the host 1202.

The flow 1200 of persistent memory allocation can begin with (1) the application 1206 allocating a namespace to the memory allocator 1208. At (2), the memory allocator 1208 may request a creation or opening of a namespace in the GUID table 1218. The namespace may then be created or opened in the GUID table, within the heterogenous memory pool 1204. At (3), a GUID may be located or found within the GUID table 1218 (e.g., in instances where a namespace has already been created within the GUID table). At (4), the stream 1210 may be opened or created that corresponds to the namespace of (1) through (3). At (5), an address of the stream 1210 that is associated with the namespace may be returned. The address corresponds to the physical location of the associated stream 1210 within the heterogenous memory pool 1204. The virtual address on the memory area that the namespace contains may be returned to the host 1202 (e.g., via the memory allocator 1208). At (6), a virtual address corresponding to the physical address of the associated stream 1210 is returned (e.g., to the application 1206). Therefore, the application 1206 may access the stream 1210 corresponding to a desired namespace, when performing functions or computations.

Figure 13:
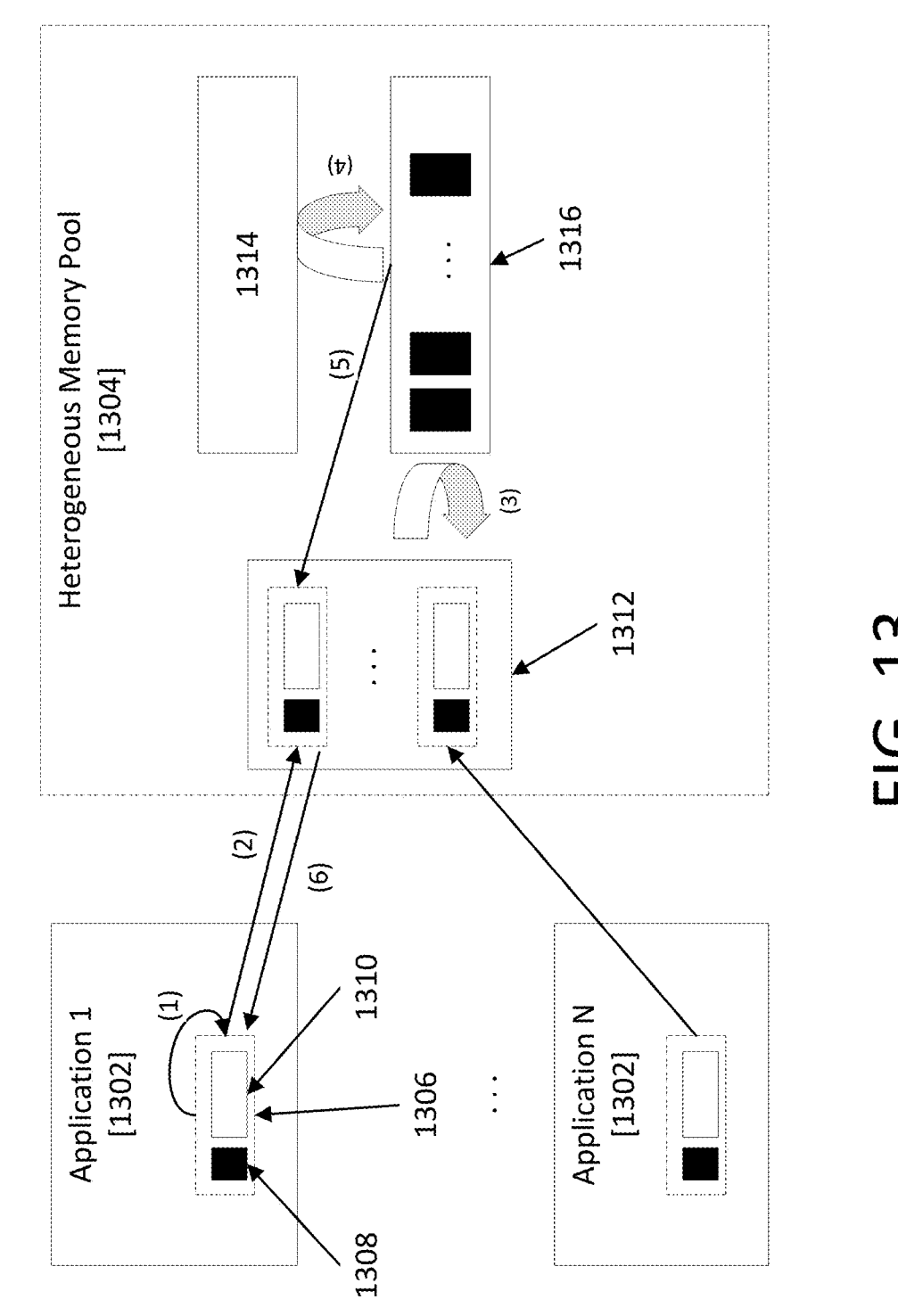
FIG. 13 illustrates an example flow of accessing persistent memory, according to some aspects described herein.

FIG. 13 illustrates an example flow 1300 of accessing persistent memory, according to some aspects described herein. The flow 1300 extends across one or more applications 1302 and one or more heterogeneous memory pools or memory pools 1304. Each of the applications 1302 can include one or more management pages or pages 1306. The pages 1306 may include metadata 1308 and/or data 1310. The metadata 1308 may describe what actions (e.g., read, write, or computation) should be executed as a result of a request. The data 1310 may be user data that needs to be processed. Alternatively, the pages 1306 may contain only metadata 1308 and no user data. The heterogenous memory pool 1304 may include a volatile and/or nonvolatile memory component (e.g., DRAM, or NVRAM) 1312, a persistent memory component 1314, and a computational component 1316 (e.g., FPGA cores). In some examples, the pages 1306 may include metadata 1308 and/or data 1310 for a plurality of computational components 1316 (e.g., a plurality of FPGA cores).

Generally, every piece of memory in FIG. 13 may be identified by a GUID of a namespace, a GUID of a stream, and an offset or address in the stream (e.g., a physical address of the stream, or a virtual address corresponding to the stream). However, a host's memory allocator (e.g., memory allocator 1208) can hide all of these details, while providing the same virtual address to an application. The application 1302 can prepare the management page 1306 that contains the metadata 1308 and the data 1310 (in examples where the management page 1306 contains both metadata and data, as opposed to other examples in accordance with the present disclosure which may contain only metadata). Further, as discussed above, a management page 1306 may contain metadata 1308 for a plurality of FPGA cores (e.g., a plurality of FPGA cores 1316). However, in some examples, the management page 1306 may only contain metadata if systems disclosed herein desire to off-load computation into the heterogeneous memory pool 1304. The management page 1306 can contain the data that results from a computation performed within the heterogenous memory pool 1304.

Access to allocated memory within the persistent memory 1314 can include at (1) creating a request for adding, updating, and or removing an item (e.g., data 1310). In some examples, computations can be executed within the heterogenous memory pool 1304 without receiving user data (e.g., via operation (1)), such as in examples where data 1310 is already stored within the persistent memory 1314. Further, operations that include removing an item do not require that any user data be received from a host device (e.g., on which application 1302 is stored). At (2), the management page 1306 (e.g., containing the request to be processed) can be written by the application 1302. The management page 1306 may include data 1310 and/or metadata 1308. The metadata 1308 may describe characteristics and location of user data in persistent memory or in a request itself. At (3) the request corresponding to the management page 1306 can be processed by the computational component 1316 (e.g., by one or more FPGA cores). Further, a single management page 1306 can manage a plurality of computational components 1316 (e.g., a plurality of FPGA cores). At (4), data corresponding to the request can be made persistent. Additionally, or alternatively, at (4) data can be sorted and/or a computation or function can be executed on data stored in the persistent memory component 1314 to manipulate the data stored therein. At (5), a result status and/or data can be set (e.g., a current state of data, after being stored, sorted, and or manipulated can be communicated to the application 1302). At (6) the result status and/or data is read from the heterogenous memory pool 1304 to the application 1302. The results status and/or data may be read using similar mechanisms described earlier herein with respect to FIGS. 10 and 11. For example, a host side (e.g., on which application 1302 is configured to run) may read requests by retrieving a state of memory from memory pages in the heterogenous memory pool 1304. Alternatively, a buffer of the host may be synchronized with a buffer of the heterogenous memory pool 1304.

Additionally, or alternatively, the host may try to check a result of a computation being performed within the stream heterogeneous memory pool 1304, before the computation is finished because a speed of operations may differ between the heterogeneous memory pool 1304 and the application 1302. It is considered that the heterogenous memory pool 1304 may generate interrupt signals or other signals that may be sent to the host at the end of a computation, such as via one or more particular computational components 1316 (FPGA cores). Additionally, or alternatively, polling can be performed, wherein a CPU of a host device (e.g., on which the application 1102 is configured to run) can try to read states of memory pages from the heterogenous memory pool 1304 multiple times.

If systems disclosed herein desire to free the allocated memory of the persistent memory component 1314, then all data items may be deleted from the stream. For example, a host device (e.g., on which the applications 1302 are stored and/or executed) may prepare the management page 1306 with a request to delete all of the items in a stream. A stream may have metadata that corresponds to a number of valid items in a stream. The metadata may be stored persistently and/or realized by hardware circuitry. The persistent memory component 1314 can be NAND flash. Therefore, deletion of one or more items may need to be stored into a log (e.g., a free NAND page of an erase block). The erase block may only be able to erased after a complete exhaustion of the erase block. If the computational component 1316 can see that the stream contains no items, then the allocated memory of the persistent memory component 1314 will be freed by the computational component 1316.

Figure 14:
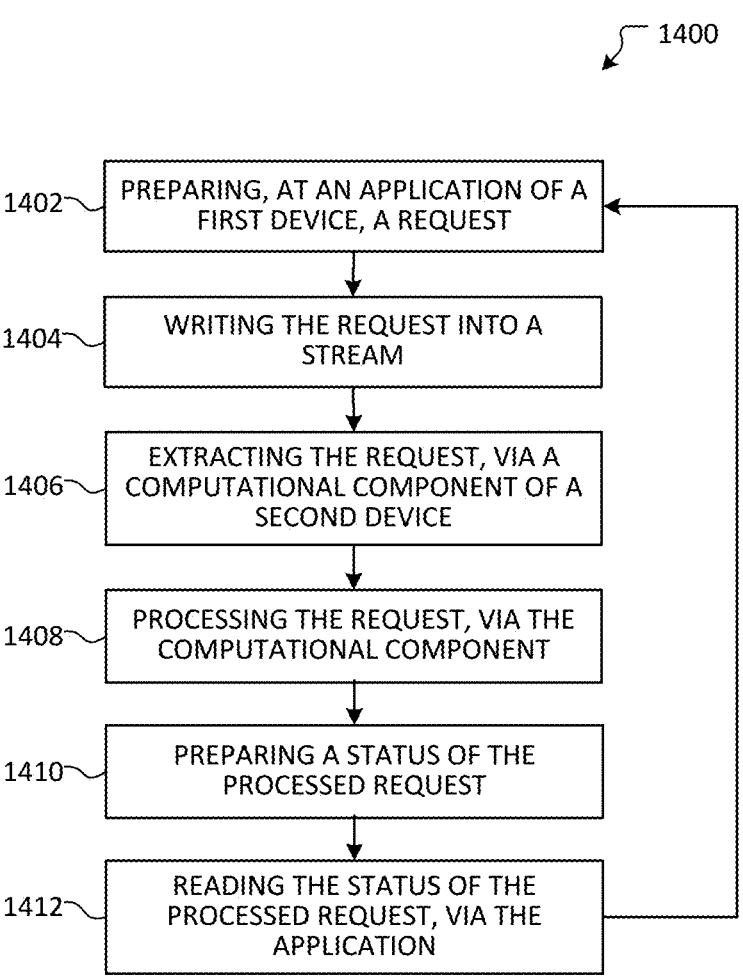
FIG. 14 illustrates an example method of allocating persistent memory, according to some aspects described herein.

FIG. 14 illustrate an example method 1400 of allocating persistent memory, according to some aspects described herein. In examples, aspects of method 1400 are performed by a system, such as system 400 or 500 discussed earlier herein with respect to FIGS. 4 and 5. Additionally, or alternatively, aspects of method 1400 may be performed by a model or flow, such as model or flow 600, 700, 800, 900, 1000, 1100, 1200, or 1300 discussed with respect to FIGS. 6-13.

Method 1400 begins at operation 1402, wherein a request is prepared at an application of a first device. The first device may be a host device (such as a host device disclosed earlier herein). Further, the request may be a conventional read/write request. Additionally, or alternatively, the request may be a data manipulation request such as a computation (e.g., Boolean computation, inference operation, arithmetic computation, etc.) to be performed on data stored within persistent memory of a heterogeneous memory pool.

At operation 1404, the request is written into a stream. For example the stream may be similar to stream 910, 1010, 1104, or 1210 discussed earlier herein with respect to FIGS. 9, 10, 11, and 12. The stream may have a corresponding name or key that is stored in a namespace. A table may be stored in the namespace.

At operation 1406, the request is extracted, via a computational component of a second device. For example, the computational component may be one or more cores of a field programmable gate array (FPGA), and the FPGA cores may extract the request.

At operation 1408, the request is processed, via the computational component of the second device. For example, the FPGA cores may process the request on persistent memory of the second device. The one or more FPGA cores may comprise a plurality of FPGA cores that are capable of performing parallel operations to the process the request.

At operation 1410, a status of the processed request is prepared. The status of the processed request may be a current state of memory that has been modified by the computational component of the second device. Additionally, or alternatively, the status of the processed request may comprise an indication of data that has been read or written from persistent memory (e.g., by the computational component). Additionally, or alternatively, the status of the processed request may be the result of a computation, such as, for example, a Boolean computation, inference operation, and/or arithmetic computation performed on data stored in the second device (e.g., a device in which the heterogeneous memory pool is located).

At operation 1412, that status of the processed request is read, via the application of the first device. The status of the processed request may be received by the application of the first device. For example, a processor (e.g., CPU) of the first device may obtain a status of the processed request from the second device. Additionally, or alternatively, the second device may transmit the status of the processed request to the first device.

Method 1400 may terminate at operation 1412. Alternatively, method 1400 may return to operation 1402, from operation 1412 to provide a continuous loop of preparing a request at a first device, and receiving a status of the request at the first device, after the request is processed.

Figure 15:
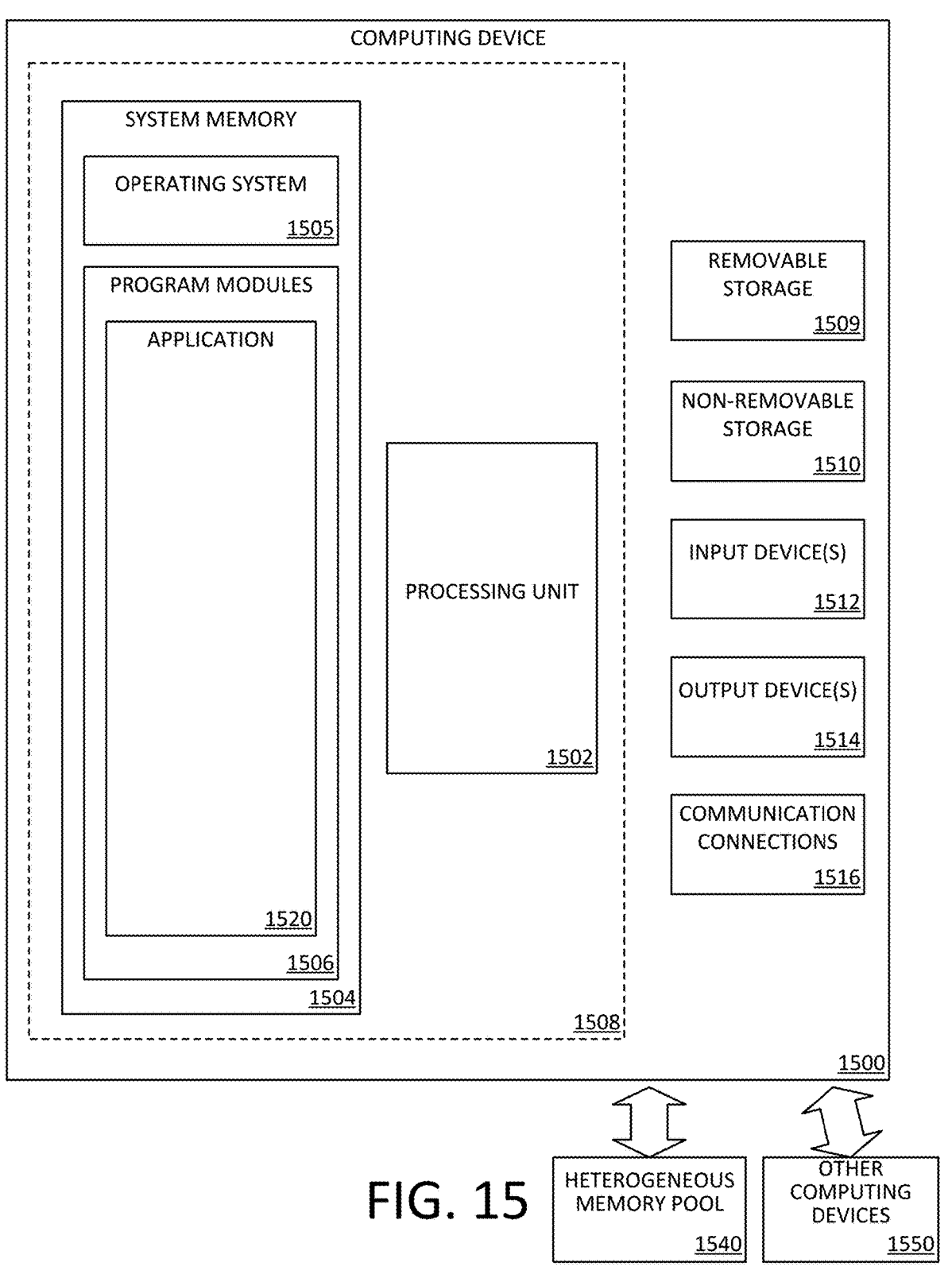
FIG. 15 is a block diagram illustrating physical components of a computing device with which aspects of the disclosure may be practiced.
Figure 16A:
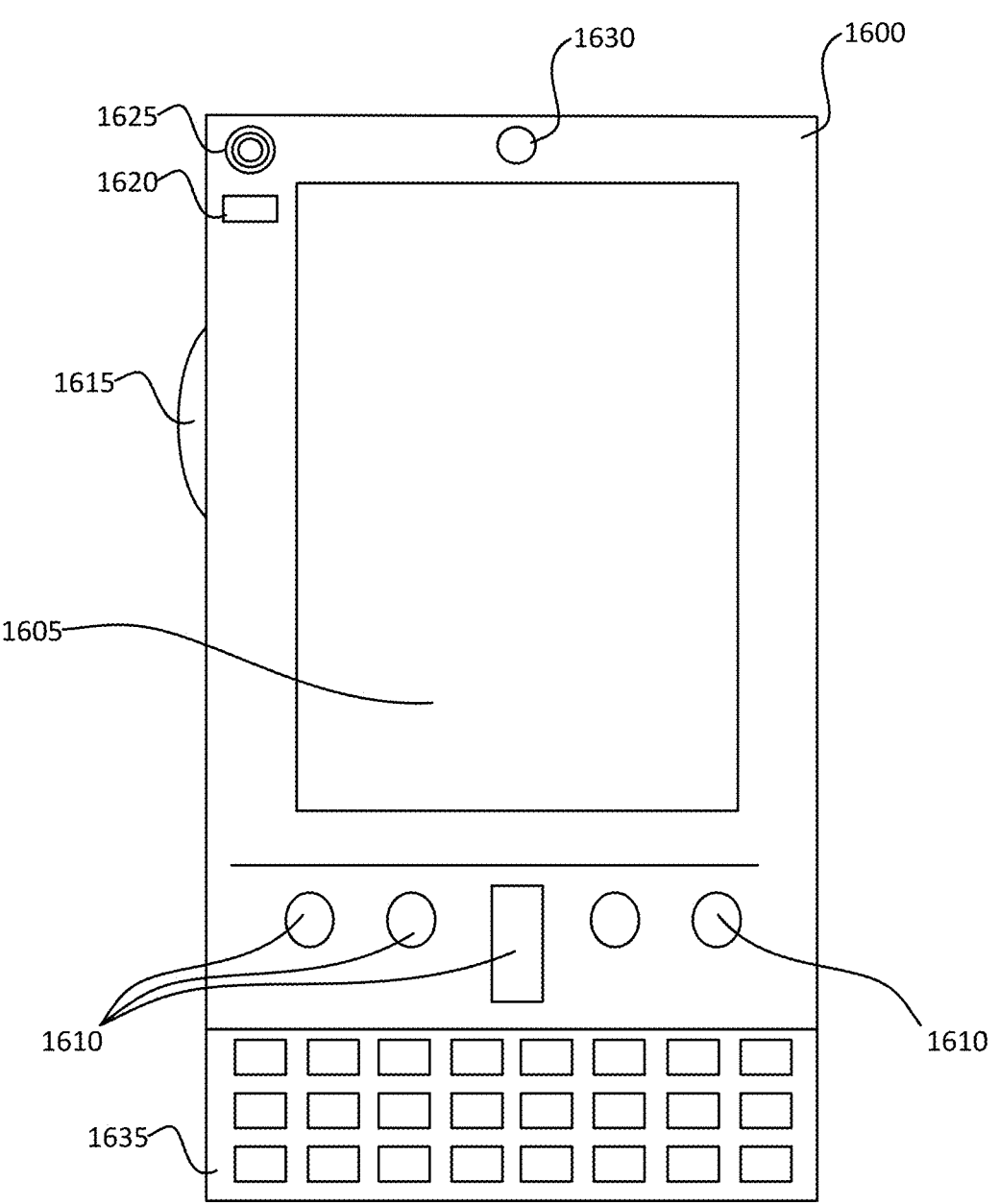
FIG. 16A illustrates a mobile computing device with which embodiments of the disclosure may be practiced.
Figure 16B:
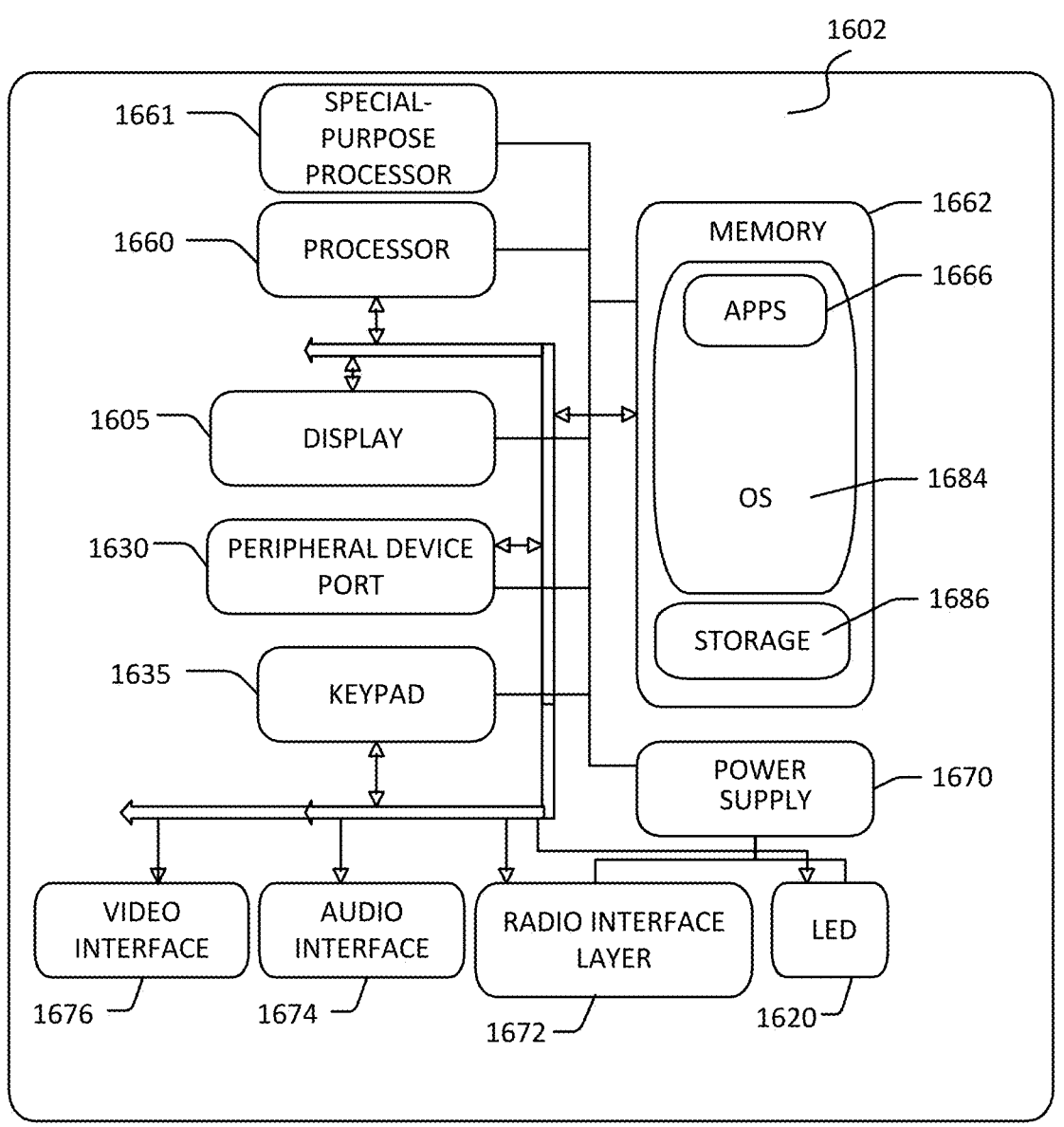
FIG. 16B is a block diagram illustrate the architecture of one aspect of a mobile computing device.
Figure 17:
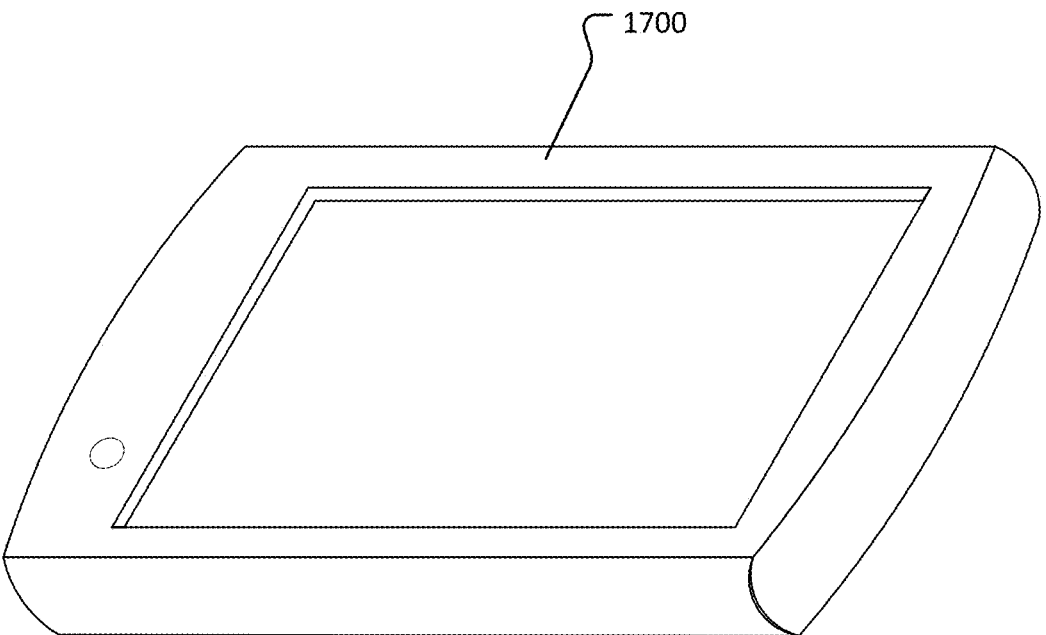
FIG. 17 illustrates an exemplary tablet computing device that may execute one or more aspects disclosed herein.

FIG. 15-17 and the associated descriptions provide a discussion of a variety of operating environments in which aspects of the disclosure may be practiced. However, the devices and systems illustrated and discussed with respect to FIGS. 15-17 are for purposes of example and illustration and are not limiting of a vast number of computing device configurations that may be utilized for practicing aspects of the disclosure, described herein.

FIG. 15 is a block diagram illustrating physical components (e.g., hardware) of a computing device 1500 with which aspects of the disclosure may be practiced. The computing device components described below may be suitable for the computing devices described above, including host devices 402, 502, 1002, 1202 discussed with respect to FIGS. 4, 5, 10, and 12, and/or a device on which an application is configured to run, such as on which applications 702, 902, and 1102 are configured to run. In a basic configuration, the computing device 1500 may include at least one processing unit 1502 and a system memory 1504. Depending on the configuration and type of computing device, the system memory 1504 may comprise, but is not limited to, volatile storage (e.g., random access memory), non-volatile storage (e.g., read-only memory), flash memory, or any combination of such memories.

The system memory 1504 may include an operating system 1505 and one or more program modules 1506 suitable for running software application 1520, such as one or more components supported by the systems described herein. The operating system 1505, for example, may be suitable for controlling the operation of the computing device 3400.

Furthermore, embodiments of the disclosure may be practiced in conjunction with a graphics library, other operating systems, or any other application program and is not limited to any particular application or system. This basic configuration is illustrated in FIG. 15 by those components within a dashed line 1508. The computing device 1500 may have additional features or functionality. For example, the computing device 1500 may also include additional data storage devices (removable and/or non-removable) such as, for example, magnetic disks, optical disks, or tape. Such additional storage is illustrated in FIG. 15 by a removable storage device 1509 and a non-removable storage device 1510.

As stated above, a number of program modules and data files may be stored in the system memory 1504. While executing on the processing unit 1502, the program modules 1506 (e.g., application 1520) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 15 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 1500 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

The computing device 1500 may also have one or more input device(s) 1512 such as a keyboard, a mouse, a pen, a sound or voice input device, a touch or swipe input device, etc. The output device(s) 1514 such as a display, speakers, a printer, etc. may also be included. The aforementioned devices are examples and others may be used. The computing device 1500 may include one or more communication connections 1516 allowing communications with other computing devices 1550 or heterogenous memory pool 1540. Examples of suitable communication connections 1516 include, but are not limited to, radio frequency (RF) transmitter, receiver, and/or transceiver circuitry; universal serial bus (USB), parallel, and/or serial ports. The heterogeneous memory pool 1540 may be similar to the heterogeneous memory pool 410, 504, 606, 704, 904, 1004, 1204, and 1304 discussed with respect to FIGS. 4-7, 9, 10, 12, and 13.

The term computer readable media as used herein may include computer storage media. Computer storage media may include volatile and nonvolatile, removable and non-removable media implemented in any method or technology for storage of information, such as computer readable instructions, data structures, or program modules. The system memory 1504, the removable storage device 1509, and the non-removable storage device 1510 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1500. Any such computer storage media may be part of the computing device 1500. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 16A and 16B illustrate a mobile computing device 1600, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 16A, one aspect of a mobile computing device 1600 for implementing the aspects is illustrated. In a basic configuration, the mobile computing device 1600 is a handheld computer having both input elements and output elements. The mobile computing device 1600 typically includes a display 1605 and one or more input buttons 1610 that allow the user to enter information into the mobile computing device 1600. The display 1605 of the mobile computing device 1600 may also function as an input device (e.g., a touch screen display).

If included, an optional side input element 1615 allows further user input. The side input element 1615 may be a rotary switch, a button, or any other type of manual input element. In alternative aspects, mobile computing device 1600 may incorporate more or less input elements. For example, the display 1605 may not be a touch screen in some embodiments.

In yet another alternative embodiment, the mobile computing device 1600 is a portable phone system, such as a cellular phone. The mobile computing device 1600 may also include an optional keypad 1635. Optional keypad 1635 may be a physical keypad or a "soft" keypad generated on the touch screen display.

In various embodiments, the output elements include the display 1605 for showing a graphical user interface (GUI), a visual indicator 1620 (e.g., a light emitting diode), and/or an audio transducer 1625 (e.g., a speaker). In some aspects, the mobile computing device 1600 incorporates a vibration transducer for providing the user with tactile feedback. In yet another aspect, the mobile computing device 1600 incorporates input and/or output ports, such as an audio input (e.g., a microphone jack), an audio output (e.g., a headphone jack), and a video output (e.g., a HDMI port) for sending signals to or receiving signals from an external device.

FIG. 16B is a block diagram illustrating the architecture of one aspect of a mobile computing device. That is, the mobile computing device 1600 can incorporate a system (e.g., an architecture) 1602 to implement some aspects. In one embodiment, the system 1602 is implemented as a "smart phone" capable of running one or more applications (e.g., browser, e-mail, calendaring, contact managers, messaging clients, games, and media clients/players). In some aspects, the system 1602 is integrated as a computing device, such as an integrated personal digital assistant (PDA) and wireless phone.

One or more application programs 1666 may be loaded into the memory 1662 and run on or in association with the operating system 1664. Examples of the application programs include phone dialer programs, e-mail programs, personal information management (PIM) programs, word processing programs, spreadsheet programs, Internet browser programs, messaging programs, and so forth. The system 1602 also includes a non-volatile storage area 1668 within the memory 1662. The non-volatile storage area 1668 may be used to store persistent information that should not be lost if the system 1602 is powered down. The application programs 1666 may use and store information in the non-volatile storage area 1668, such as e-mail or other messages used by an e-mail application, and the like. A synchronization application (not shown) also resides on the system 1602 and is programmed to interact with a corresponding synchronization application resident on a host computer to keep the information stored in the non-volatile storage area 1668 synchronized with corresponding information stored at the host computer. As should be appreciated, other applications may be loaded into the memory 1662 and run on the mobile computing device 1600 described herein (e.g., a signal identification component, a gaze tracker component, a shared computing component, etc.).

The system 1602 has a power supply 1670, which may be implemented as one or more batteries. The power supply 1670 might further include an external power source, such as an AC adapter or a powered docking cradle that supplements or recharges the batteries.

The system 1602 may also include a radio interface layer 1672 that performs the function of transmitting and receiving radio frequency communications. The radio interface layer 1672 facilitates wireless connectivity between the system 1602 and the "outside world," via a communications carrier or service provider. Transmissions to and from the radio interface layer 1672 are conducted under control of the operating system 1664. In other words, communications received by the radio interface layer 1672 may be disseminated to the application programs 1666 via the operating system 1664, and vice versa.

The visual indicator 1620 may be used to provide visual notifications, and/or an audio interface 1674 may be used for producing audible notifications via the audio transducer 1625. In the illustrated embodiment, the visual indicator 1620 is a light emitting diode (LED) and the audio transducer 1625 is a speaker. These devices may be directly coupled to the power supply 1670 so that when activated, they remain on for a duration dictated by the notification mechanism even though the processor 1660 and/or special-purpose processor 1661 and other components might shut down for conserving battery power. The LED may be programmed to remain on indefinitely until the user takes action to indicate the powered-on status of the device. The audio interface 1674 is used to provide audible signals to and receive audible signals from the user. For example, in addition to being coupled to the audio transducer 1625, the audio interface 1674 may also be coupled to a microphone to receive audible input, such as to facilitate a telephone conversation. In accordance with embodiments of the present disclosure, the microphone may also serve as an audio sensor to facilitate control of notifications, as will be described below. The system 1602 may further include a video interface 1676 that enables an operation of an on-board camera 1630 to record still images, video stream, and the like.

A mobile computing device 1600 implementing the system 1602 may have additional features or functionality. For example, the mobile computing device 1600 may also include additional data storage devices (removable and/or non-removable) such as, magnetic disks, optical disks, or tape. Such additional storage is illustrated in FIG. 16B by the non-volatile storage area 1668.

Data/information generated or captured by the mobile computing device 1600 and stored via the system 1602 may be stored locally on the mobile computing device 1600, as described above, or the data may be stored on any number of storage media that may be accessed by the device via the radio interface layer 1672 or via a wired connection between the mobile computing device 1600 and a separate computing device associated with the mobile computing device 1600, for example, a server computer in a distributed computing network, such as the Internet. As should be appreciated such data/information may be accessed via the mobile computing device 1600 via the radio interface layer 1672 or via a distributed computing network. Similarly, such data/information may be readily transferred between computing devices for storage and use according to well-known data/information transfer and storage means, including electronic mail and collaborative data/information sharing systems.

FIG. 17 illustrates an exemplary tablet computing device 1700 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use claimed aspects of the disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A storage system comprising:
   a host device comprising an application and a memory allocator stored thereon; and
   a heterogenous memory pool comprising at least one of a volatile or non-volatile memory component, a persistent memory component, and a computational component, the computational component being in communication with the persistent memory component and the at least one of the volatile or non-volatile memory component, the at least one of the volatile or non-volatile memory component being different from the persistent memory component, the at least one of the volatile or non-volatile memory component including dynamic random access memory (DRAM) or non-volatile random access memory (NVRAM);
   wherein the host device is in communication with the heterogenous memory pool, via the memory allocator, to offload computations from the host device to the heterogenous memory pool,
   wherein the application generates a request to access one or more streams each comprising a memory address range for allocating persistent memory of the persistent memory component, and writes the request into a request queue stored in the dynamic random access memory (DRAM) or the non-volatile random access memory (NVRAM), the request queue being mapped to the one or more streams, and
   wherein the computational component extracts the request from the at least one of the volatile or nonvolatile memory component and processes the request on the persistent memory of the persistent memory component.

2. The storage system of claim 1, wherein the at least one of the volatile or non-volatile memory component is volatile memory component that comprises a dynamic random access memory component.

3. The storage system of claim 1, wherein the computational component includes a field programmable gate array including one or more cores.

4. The storage system of claim 1, wherein the application comprises a management page, the management page including metadata.

5. The storage system of claim 4, wherein the metadata corresponds to one or more actions to be executed, within the heterogeneous memory pool, as a result of a request from the application.

6. The storage system of claim 5, wherein the data corresponds to user data.

7. The storage system of claim 1, wherein the at least one of the volatile or non-volatile memory component, the persistent memory component, and the computational component form the one or more streams representing a namespace identifiable by a key.

8. The storage system of claim 1, wherein the storage system is a database storage system.

9. A method of allocating persistent memory, the method comprising:

preparing, at an application of a first device, a request to access one or more streams each comprising a memory address range for allocating persistent memory of a second device;

writing the request into a request queue stored in dynamic random access memory (DRAM) or non-volatile random access memory (NVRAM) of at least one of a volatile or non-volatile memory component of the second device, the request queue being mapped to the one or more streams, the at least one of the volatile or non-volatile memory component being different from the persistent memory of the second device;

extracting the request, via a computational component of the second device, from the at least one of a volatile or non-volatile memory component of the second device;

processing the request, via the computational component, on the persistent memory of the second device;

preparing a status of the processed request on the persistent memory of the second device; and reading the status of the processed request, via the application.

10. The method of claim 9, wherein the one or more streams comprise at least one of a non-volatile or volatile memory component, a persistent memory component, and the computational component.

11. The method of claim 10, wherein the computation component includes one or more cores of a field programmable gate array (FPGA), an application specific integrated circuit (ASIC), or a reduced instruction set computer (RISC-V).

12. The method of claim 11, wherein the one or more cores are embedded on the second device, and wherein the second device is different than the first device.

13. The method of claim 12, wherein the first device is a host device, and wherein the second device is a storage device comprising a heterogeneous memory pool.

14. The method of claim 9, wherein at least one of the one or more streams corresponds to a global unique identifier (GUID), and wherein the GUID is stored in a GUID table comprising a plurality of GUIDs.

15. A storage system comprising:

a first device comprising a computational component;

a second device comprising a computational component; and memory storing instructions that, when executed by the computational component of at least one of the first device or the second device, causes the system to perform a set of operation, the set of operations comprising:

preparing, at an application of the first device, a request to access one or more streams each comprising a memory address range for allocating persistent memory of the second device;

writing the request into a request queue stored in dynamic random access memory (DRAM) or non-volatile random access memory (NVRAM) of at least one of a volatile or non-volatile memory component of the second device, the request queue being mapped to the one or more streams, the at least one of the volatile or non-volatile memory component being different from the persistent memory of the second device;

extracting the request, via the computational component of the second device, from the at least one of the volatile or non-volatile memory component of the second device;

processing the request, via the computational component of the second device, on the persistent memory of the second device;

preparing a status of the processed request on the persistent memory of the second device; and reading the status of the processed request, via the application.

16. The system of claim 15, wherein the computational component of the first device is a central processing unit (CPU), and wherein the computational component of the second device is one or more of a field programmable gate array (FPGA), an application specific integrated circuit (ASIC), or a reduced instruction set computer (RISC-V), the computational component of the second device comprising one or more cores.

17. The system of claim 15, wherein the one or more streams comprise a non-volatile or volatile memory component, a persistent memory component, and the computational component of the second device.

18. The system of claim 17, wherein the first device is a host device, and wherein the second device is a storage device comprising a heterogeneous memory pool.

19. The system of claim 18, wherein the one or more streams are stored within the heterogeneous memory pool.

20. The system of claim 19, wherein at least one of the one or more streams corresponds to a global unique identifier (GUID), and wherein the GUID is stored in a GUID table, the GUID table being stored within the heterogeneous memory pool, and the GUID table being accessible via a memory allocator of the first device.

* * * * *